United States Patent [19]
Park

[11] Patent Number: 5,637,056
[45] Date of Patent: Jun. 10, 1997

[54] AUTOMATIC TRANSMISSION SYSTEM FOR AUTOMOTIVE VEHICLE

[75] Inventor: Jongsul Park, Seoul, Rep. of Korea

[73] Assignee: Hyundai Motor Company, Seoul, Rep. of Korea

[21] Appl. No.: 434,539

[22] Filed: May 4, 1995

[51] Int. Cl.⁶ .................................................. F16H 61/26
[52] U.S. Cl. ........................... 477/131; 477/143; 477/160
[58] Field of Search ................................ 477/130, 131, 477/158, 159, 160, 163, 143

[56] References Cited

U.S. PATENT DOCUMENTS

| | | | |
|---|---|---|---|
| 4,369,677 | 1/1983 | Lewis | 477/158 |
| 4,745,826 | 5/1988 | Nishikawa et al. | 477/163 |
| 4,787,272 | 11/1988 | Taga et al. | 477/158 |
| 5,086,672 | 2/1992 | Kato et al. | 477/126 |
| 5,507,706 | 4/1996 | Jang et al. | 477/156 |

*Primary Examiner*—Charles A. Marmor
*Assistant Examiner*—Sherry Lynn Estremsky

[57] ABSTRACT

An automatic transmission system for automotive vehicle includes a hydraulic pump for pressurizing fluid, a pressure regulating valve for varying hydraulic pressure supplied from the hydraulic pump, nine friction elements activated by drive pressure or reverse pressure supplied from a manual valve, first and second shift control sections having at least two shift valves for supplying hydraulic pressure to the friction elements, selectively, and a torque pressure converting section for supplying torque pressure to the first shift control section. The system performs five forward speeds and one reverse speed. Two solenoid valves are adopted to control four shift valves and control is performed sequentially such that the construction of the system can be simplified and the shift feeling can be improved.

20 Claims, 17 Drawing Sheets

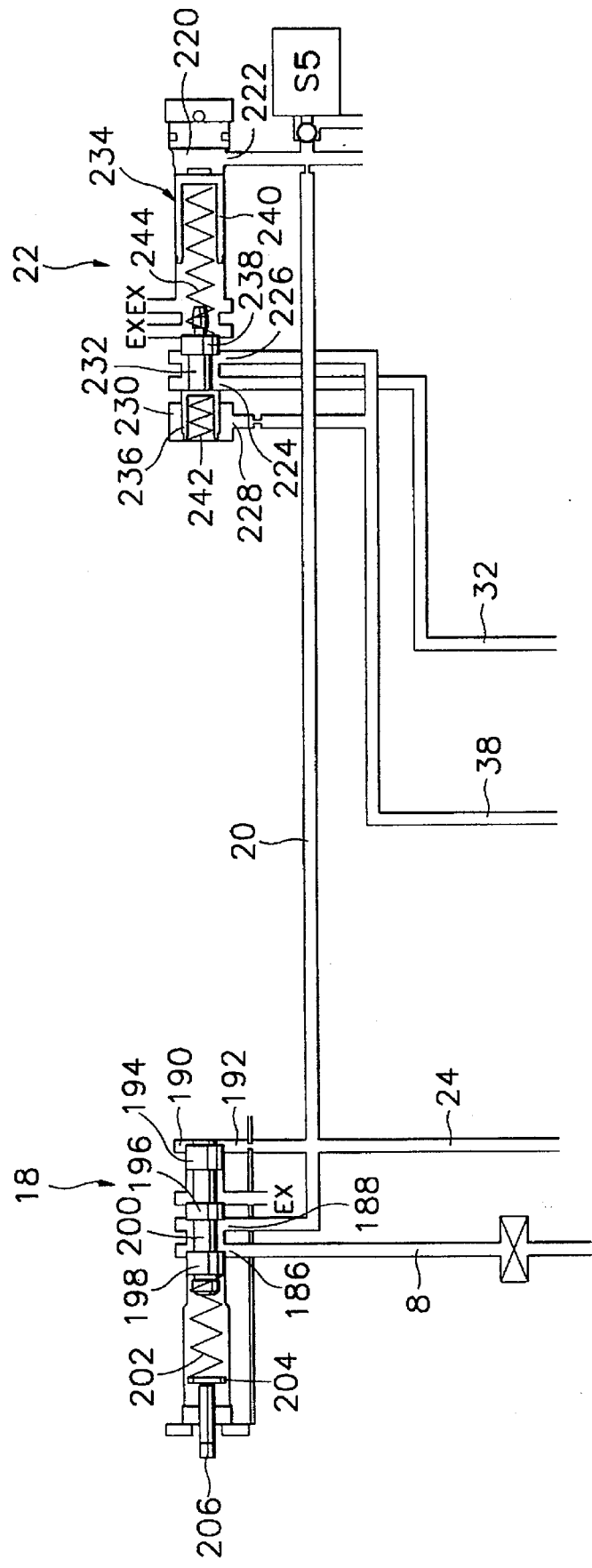

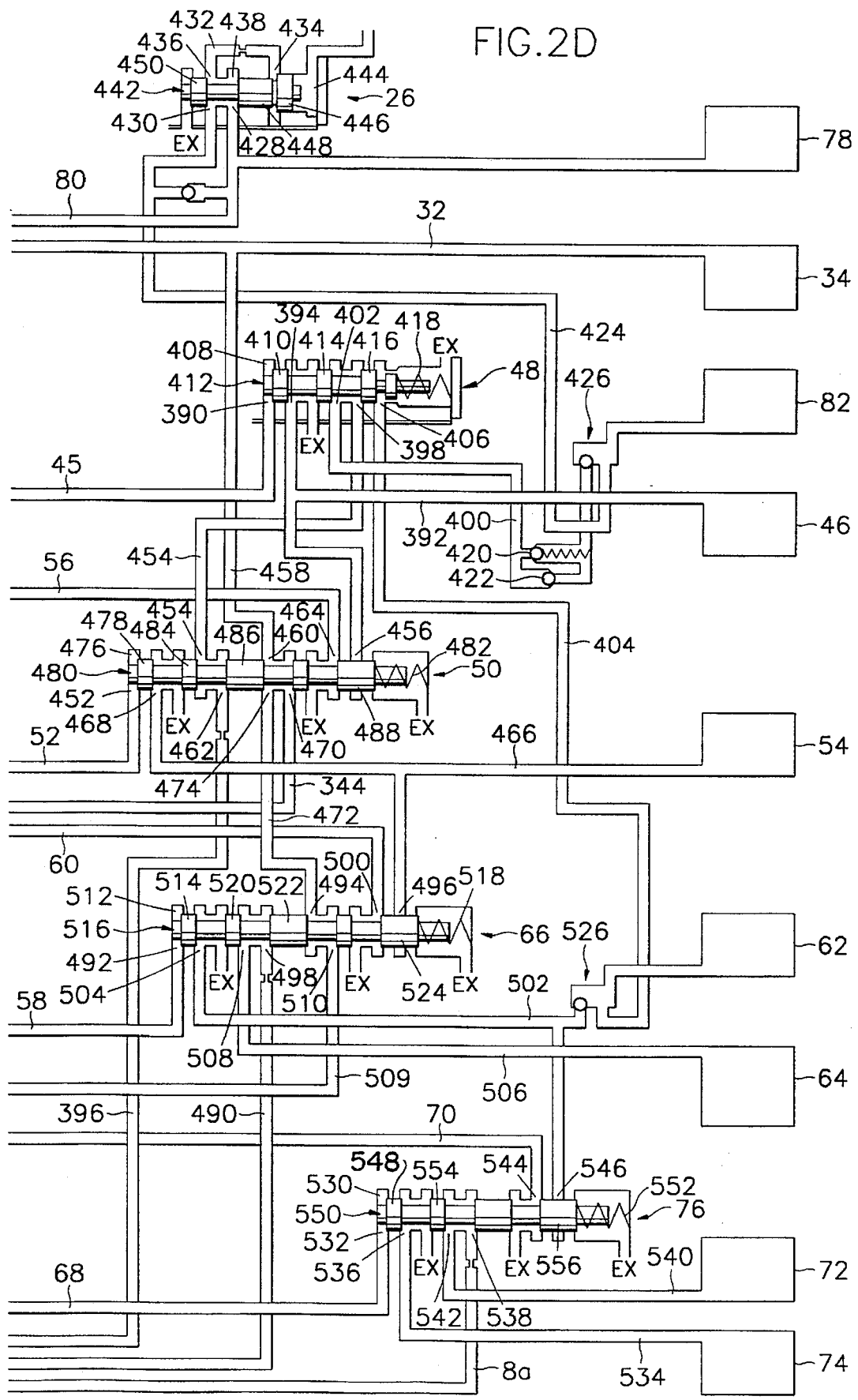

FIG.14A

| FRICTION ELEMENTS / RANGES | | 82 | 46 | 62 | 74 | 64 | 34 | 54 | 78 | 72 |
|---|---|---|---|---|---|---|---|---|---|---|
| P | | | | | | | | | | |
| R | | O | | | | | | | O | O |
| N | | | | | | | | | | O |
| D5 | 1 | | | | | | O | | | O |
| D5 | 2 | | O | | | | O | | | O |
| D5 | 3 | | O | | | | O | O | | O |
| D5 | 4 | | O | O | | | O | O | | O |
| D5 | 5 | | O | O | O | | O | O | | |
| D4 | 1 | | | | | | O | | | O |
| D4 | 2 | | O | | | | O | | | O |
| D4 | 3 | | O | | | | O | O | | O |
| D4 | 4 | | O | O | | | O | O | | O |
| 3 | 1 | | | | | O | O | | | O |
| 3 | 2 | | O | | | O | O | | | O |
| 3 | 3 | | O | | | O | O | O | | O |
| 2 | 1 | O | | | | O | O | | | O |
| 2 | 2 | | O | O | | O | O | | | O |
| 1 | 1 | O | | | | O | O | | | O |

O : ACTIVATED

FIG.14B

| SOLENOID VALVES / SHIFT STAGES | S1 | S2 | S5 | |
|---|---|---|---|---|
| | | | UPSHIFT | DOWNSHIFT |
| 1 | ON | ON | ON | |
| 1↔2 | ON | ON | ON → OFF | OFF → ON |
| 2 | OFF | ON | OFF | |
| 2↔3 | OFF → ON | OFF | ON → OFF | OFF → ON |
| 3 | ON | ON | OFF | |
| 3↔4 | OFF | ON → OFF | ON → OFF | OFF → ON |
| 4 | ON | OFF | OFF | |
| 4↔5 | ON | ON | ON → OFF | OFF → ON |
| 5 | ON | OFF | OFF | |

5,637,056

AUTOMATIC TRANSMISSION SYSTEM FOR AUTOMOTIVE VEHICLE

BACKGROUND OF THE INVENTION

1. Field of the Invention

This invention relates to an automatic transmission system for an automotive vehicle and, more particularly, to an automatic transmission system wherein two solenoid valves are adopted to control four shift valves such that a construction of the system can be simplified and shift feeling can be improved.

2. Description of the Conventional Art

A conventional automatic transmission for an automotive vehicle has a torque converter and a multiple stage transmission gear mechanism connected with the torque converter, which includes hydraulically activated friction members for selecting one of a plurality of gear stages of a transmission gear mechanism according to a vehicle operating condition.

A hydraulic control system pressurized by a hydraulic pump provides the hydraulic pressure required to operate the friction members and control valves.

A commonly used automatic transmission of a vehicle has a hydraulic torque converter which generally includes a pump impeller connected with an engine output shaft to be driven thereby, a turbine runner with an output shaft member, and a stator disposed between the pump impeller and the turbine runner, so that the fluid is circulated by the engine driven pump impeller through the turbine runner with the aid of the stator which functions to deflect the fluid from the turbine runner to a direction where the fluid flow does not disturb the rotation of the pump impeller when the fluid flows into the pump impeller.

Automatic shifting is performed by operating the friction members such as clutches or a kick-down brake at each shifting stage.

The friction elements are selectively activated as a flow of hydraulic pressure in the hydraulic control system is regulated by a plurality of valves. A manual valve having ports which are converted by selecting a position of a selector lever, is designed to be supplied with fluid from the hydraulic pump and to supply the fluid to a shift control valve.

The conventional automatic transmission system has a complicated valve body construction and, thus, the valve body is expensive and difficult to manufacture because there are a lot of valves in the system. Also, a shift feeling when shifting a speed stage is not good.

SUMMARY OF THE INVENTION

An object of the invention is to solve the above-mentioned problems of conventional systems. Provided for this purpose is an automatic transmission system which can perform five forward speeds and one reverse speed, wherein two Solenoid valves are adopted to control four shift valves and control is performed sequentially such that the construction of the system can be simplified and the shift feeling can be improved.

In order to accomplish this and other objects, the invention provides an automatic transmission for an automotive vehicle comprising a hydraulic pump, driven by an engine, for pressurizing fluid; a pressure regulating valve for varying hydraulic pressure supplied from the hydraulic pump when driving the vehicle forward or rearward; a torque converter for transmitting power of the engine to an input shaft of the transmission; a converter clutch regulator valve for activating a damper clutch to improve a transmission efficiency of the torque converter; a solenoid supply valve for receiving line pressure from the pressure regulating valve and supplying reduced pressure to first, second, third, fourth, fifth and sixth solenoid valves; a first friction element commonly activated at each speed stage; second, third, fourth, fifth, sixth, seventh, eighth and ninth friction elements, at least one of which is activated according to the speed stages; a torque control regulator valve for supplying torque pressure required to activate the friction elements; a manual valve; first-to-Second and third-to-fourth speed shift valves for selectively supplying the torque pressure supplied from the torque control regulator valve or drive pressure regulated by the pressure regulating valve and supplied from the manual valve to the friction elements according to an ON/OFF operation of the first solenoid valve to shift speed; second-to-third and fourth-to-fifth speed shift valves for selectively supplying the torque pressure supplied from the torque control regulator valve or the drive pressure regulated by the pressure regulating valve and supplied from the manual valve to the friction elements according to an ON/OFF operation of the second solenoid valve to shift speed; and second and third speed clutch valves, a fourth band valve and an over-drive unit valve controlled by the torque pressure for supplying activating pressure to the friction elements of the respective speed stages and supplying the activating pressure of subsequent speed stages to the shift valves, wherein the manual valve supplies the line pressure regulated by the pressure regulating valve according to a position of a shift lever to the torque control regulator valve, the clutch valves and the band valve or to the first and sixth friction elements.

Also, the present invention provides the automatic transmission system wherein the eighth friction element is a reverse friction element connected to the manual valve directly via a reverse pressure conduit to receive hydraulic pressure therefrom.

Also, the present invention provides the automatic transmission system wherein a reverse clutch inhibiter valve for keeping the vehicle from being driven rearward when a reverse range is selected at a drive range to obstruct supply of hydraulic pressure to the ninth friction element is disposed in a reverse pressure conduit through which hydraulic pressure is supplied to the eighth friction element to provide an emergency safety means.

Also, the present invention provides the automatic transmission system wherein the torque control regulator valve comprises a pressure chamber for receiving hydraulic pressure controlled by the sixth solenoid valve; a first spool for selectively obstructing the torque pressure supplied to the first-to-second shift valve; a second spool for to which pressure in the pressure chamber is applied; a first elastic member for biasing the first spool; and a second elastic member disposed between the first spool and the second spool to support the first and second spools elastically, said second elastic member exerting an elastic force bigger than that of the first elastic member.

Also, the present invention provides the automatic transmission system wherein the first-to-second shift valve comprises first, second and third ports for receiving hydraulic pressure from control pressure, torque pressure and drive pressure conduits, respectively; a fourth port communicating with the third clutch valve; a fifth port communicating with a control pressure branch conduit; sixth and seventh ports for transmitting the torque pressure and control pressure, respectively, to second-to-third shift valve 40; an eighth port for supplying hydraulic pressure to the second clutch valve;

a spool for opening or closing the ports by an ON/OFF operation of the first solenoid valve and hydraulic pressure supplied from the third clutch valve.

Also, the present invention provides the automatic transmission system wherein the second-to-third shift valve comprises a first port connected to a control conduit; second and third ports for receiving hydraulic pressure from the first-to-second shift valve; a fourth port for receiving the drive pressure from the third clutch valve; fifth and sixth ports for transmitting the torque pressure and control pressure, respectively, to the third-to-fourth shift valve; a seventh port for transmitting hydraulic pressure to the third clutch valve; an eighth port for receiving the drive pressure from the four band valve; and a spool for opening or closing the ports according to an ON/OFF control of the second solenoid valve.

Also, the present invention provides the automatic transmission system wherein the third-to-fourth shift valve comprises a first port communicating with a branch conduit; second and third ports for receiving hydraulic pressure from the first-to-second shift valve; a fourth port for receiving the drive pressure from the fourth band valve; fifth and sixth ports for transmitting the torque pressure and control pressure, respectively, to the fourth-to-fifth shift valve; a seventh port for transmitting hydraulic pressure to the fourth band valve; and an eighth port communicating with the third shift valve; and a spool for opening or closing the ports according to an ON/OFF control of the first solenoid valve.

Also, the present invention provides the automatic transmission system wherein the fourth-to-fifth shift valve comprises a first port connected to the fourth band valve; second and third ports for receiving the torque pressure and control pressure, respectively, from the third-to-fourth shift valve; a fourth port for receiving the drive pressure from the over-drive unit valve; a fifth port communicating with a control conduit for receiving the control pressure; a sixth port communicating with the over-drive unit valve for transmitting the torque pressure or the drive pressure; and a spool for opening or closing the ports according to an ON/OFF control of the second solenoid valve Also, the present invention provides the automatic transmission system wherein the manual valve has modes for "P", "R", "N", "D", "3", "2" and "L" ranges.

Also, the present invention provides the automatic transmission system wherein the manual valve can be shifted to the "D", "3", "2" and "L" ranges manually.

Also, the present invention provides the automatic transmission system wherein the drive pressure is supplied to the first friction element directly and the sixth friction element is activated through the overdrive unit valve at a first speed of the "D" range.

Also, the present invention provides the automatic transmission system wherein the first solenoid valve for controlling the first-to-second and third-to-fourth shift valves is controlled to an OFF state and the second solenoid valve for controlling the second-to-third and fourth-to-fifth shift valves is controlled to an ON state to supply the drive pressure to friction elements which are activated at a first speed stage and to a second friction element at a second speed of the "D" range.

Also, the present invention provides the automatic transmission system wherein the first and second solenoid valves are controlled to ON states to supply the drive pressure to friction elements which are activated at a second speed stage to a third friction element at a third speed of the "D" range.

Also, the present invention provides the automatic transmission system wherein the first solenoid valve for controlling the first-to-second and third-to-fourth shift valves is controlled to an ON state and the second solenoid valve for controlling the second-to-third and fourth-to-fifth shift valves is controlled to an OFF State to supply the drive pressure to friction elements which are activated at a third speed stage and to a fourth friction element at a fourth speed of the "D" range.

Also, the present invention provides the automatic transmission system wherein the first solenoid valve for controlling the first-to-second and third-to-fourth shift valves is controlled to an ON state and the second solenoid valve for controlling the second-to-third and fourth-to-fifth shift valves is controlled to an OFF state to deactivate the sixth friction element among friction elements which are activated at the fourth speed stage and to supply the drive pressure to a seventh friction element at a fifth speed of the range.

Also, the present invention provides the automatic transmission system wherein the solenoid supply valve has a spool, an elastic member for biasing the spool to regulate hydraulic pressure exhausted from the solenoid supply valve, and a screw for compressing or releasing the elastic member.

Also, the present invention provides the automatic transmission system wherein the fifth solenoid valve is controlled from an ON state to an OFF state gradually when shifting up and is controlled from the OFF state to the ON state when shifting down.

Also, the present invention provides the automatic transmission system wherein the fifth solenoid valve is controlled to an ON state at a first speed and to an OFF state at other speed stages after a speed shifting.

BRIEF DESCRIPTION OF THE DRAWINGS

FIG. 2B is an enlarged view of a torque pressure conversion section of the hydraulic control system of FIG. 1;

FIG. 2D is an enlarged view of a second shift control section oft he hydraulic control system of FIG. 1;

FIG. 14A is a table of friction element operation for each speed stage; and

FIG. 14B is a table of solenoid valve operation for each speed stage.

DETAILED DESCRIPTION OF THE PREFERRED EMBODIMENT

Following are the descriptions with reference to the attached drawings wherein same numbering systems are used to represent the same component parts. In the figures, EX denotes exhaust ports.

Figure 1:
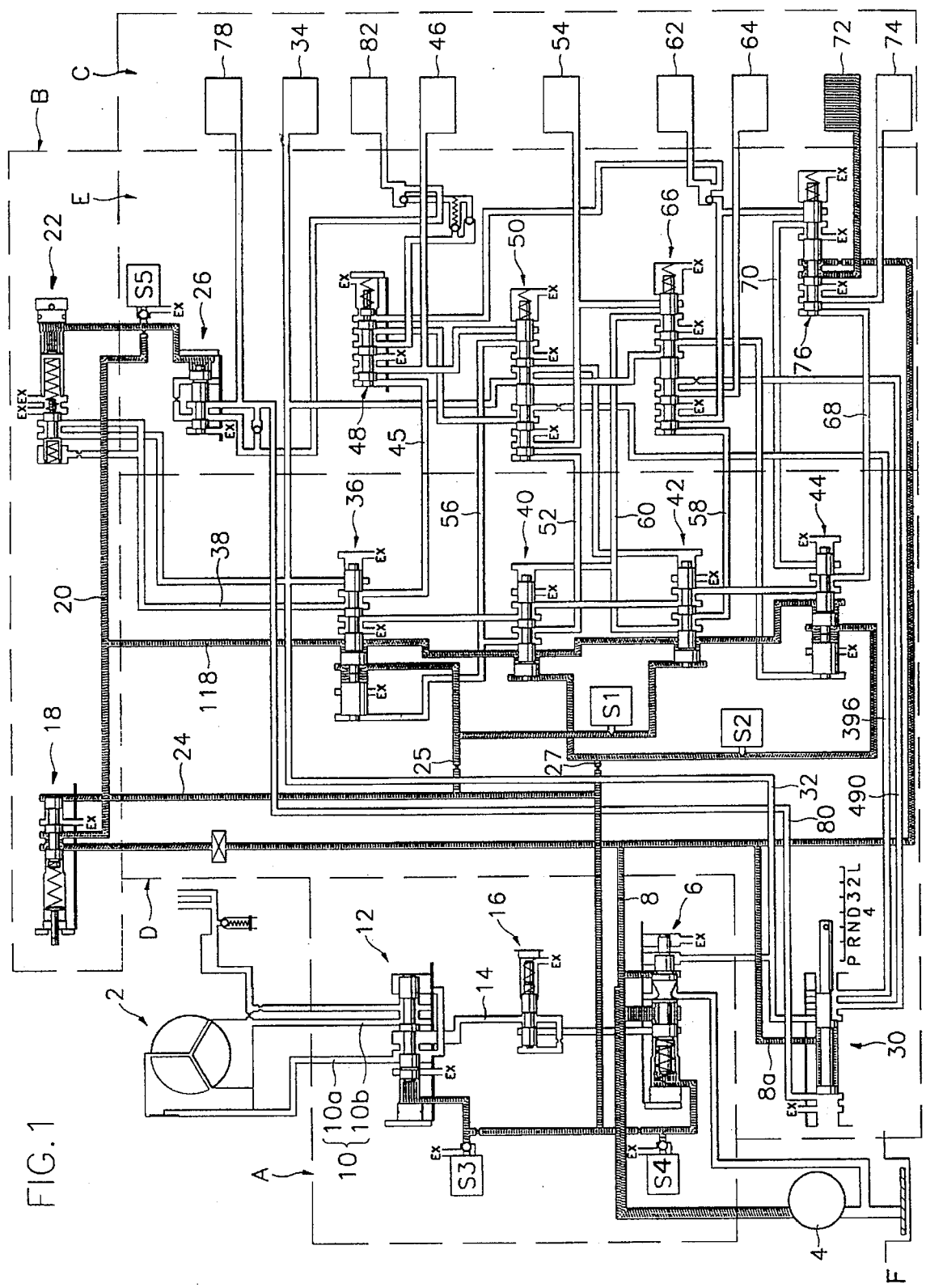
FIG. 1 is a schematic view of a hydraulic control system according to an embodiment of the invention at an "N" (neutral) range.

Referring to FIG. 1 illustrating a hydraulic control system according to an embodiment of the invention at an "N" (neutral) range, the hydraulic control system includes a torque converter 2 located between a crank shaft and a transmission for transmitting the engine power; a hydraulic pump 4 having a drive gear fixed to a pump drive hub of the torque converter for rotation therewith and a driven gear engaged with the drive gear; a damper clutch control section A for activating or deactivating a damper clutch of torque converter 2 by regulating hydraulic pressure generated at the hydraulic pump 4; a torque pressure conversion section B for reducing hydraulic pressure supplied to first and second solenoid valves S1 and S2 to convert drive pressure supplied from the hydraulic pump 4 to levels required for activating friction elements; and shift stage friction elements section C and first and second shift control sections D and E whereto torque pressure or drive pressure is selectively supplied.

A pressure regulating valve 6 for regulating line pressure when changing from a neutral N range to drive or reverse ranges is connected to an outlet of the hydraulic pump 4 via a conduit 8.

A Pressure regulating valve 6 is connected via a conduit 14 to converter clutch regulator valve 12 which supplies hydraulic pressure to the torque converter 2 through the conduit 10. A converter feed valve 16 for supplying or obstructing hydraulic pressure is installed in conduit 14.

A spool of the converter clutch regulator valve 12 is displaced by a third solenoid valve S3 which is controlled by a transmission control unit (not shown) (hereinafter referred to as "TCU") to enable one of conduits 10a and 10b of conduit 10 to communicate with conduit 14 and to activate or deactivate the damper clutch of torque converter 2.

The conduit 8 is further extended and connected to a solenoid supply valve 18 of the torque pressure conversion section B to reduce the line pressure. A portion of pressurized fluid whose pressure is reduced during its passage through solenoid supply valve 18 can be supplied to a torque control regulator valve 22.

Also, a control conduit 24 branched from a conduit 20 is connected to the pressure regulating valve 6 and converter clutch regulator valve 12 to allow control pressure to be supplied therethrough. The control pressure can be regulated by third and fourth solenoid valves S3 and S4.

A spool of the torque control regulator valve 22 is displaced by a fifth solenoid valve S5 which is controlled by the TCU. The solenoid valve S5 opens or closes conduit 20 to apply or release hydraulic pressure which exerts a force on the spool of the torque control regulator valve 22.

The conduit 20 is further extended from the fifth solenoid valve 85 to provide hydraulic connection for applying hydraulic pressure on a spool of a reverse inhibiter valve 26. The reverse inhibiter valve 26 is an emergency safety valve which prevents the vehicle from being driven rearward when the shift lever is selected to the reverse range by error while driving forward, and this operation is made possible by virtue the fifth solenoid valve S5 which is ON/OFF-controlled by the TCU.

A manual valve 30 has modes for "P", "R", "N", "D", "3", "2" and "L" ranges, and hydraulic connections are provided to supply hydraulic pressure to a drive pressure conduit 32 at the "D", "3", "2" and "L" ranges.

The drive pressure conduit 32 is connected to the torque control regulator valve 22 and to a first friction element 34 of the shift stage friction element section C.

Also, the drive pressure conduit 32 is connected to a first-to-second shift valve 36, and the first-to-second shift valve 36 is connected via a torque pressure conduit 38 to the torque control regulator valve 22 to receive hydraulic pressure from the drive pressure conduit 32 according to an operation of the torque control regulator valve 22.

The control conduit 24 which is connected to conduit 20 to control the pressure regulating valve 6 and converter clutch regulator valve 12 is branched off in two ways. One branch 25 is connected to first-to-second and third-to-fourth shift valves 36 and 42, and another branch 27 is connected to second-to-third and fourth-to-fifth shift valves 40 and 44.

The first-to-second shift valve 36 is connected via a conduit 45 to a second clutch valve 48 which also communicates with a third clutch valve 50. Thus, a portion of pressurized fluid supplied from the first-to-second shift valve 36 can be transmitted to the third clutch valve 50. The second-to-third shift valve 40 is connected via a conduit 52 to the third clutch valve 50 which communicates with the first-to-second and second-to-third shift valves 36 and 40 through a conduit 56.

Also, the third-to-fourth shift valve 42 is connected to a fourth band valve 66 through which hydraulic pressure can be supplied to fourth and fifth friction elements 62 and 64 via conduits 58 and 60, respectively. The fourth-to-fifth shift valve 44 is connected to an over-drive unit valve 76 through which hydraulic pressure can be supplied to sixth and seventh friction elements 72 and 74 via conduits 68 and 70, respectively.

The shift stage friction element section C includes an eighth friction element 78 which is connected to a reverse pressure conduit 80 connected to the manual valve 30 to receive hydraulic pressure therefrom and a ninth friction element 82. The eighth friction element 78 is a reverse friction element which is activated at reverse mode only, and the ninth friction element 82 is a low reverse clutch.

Figure 2A:
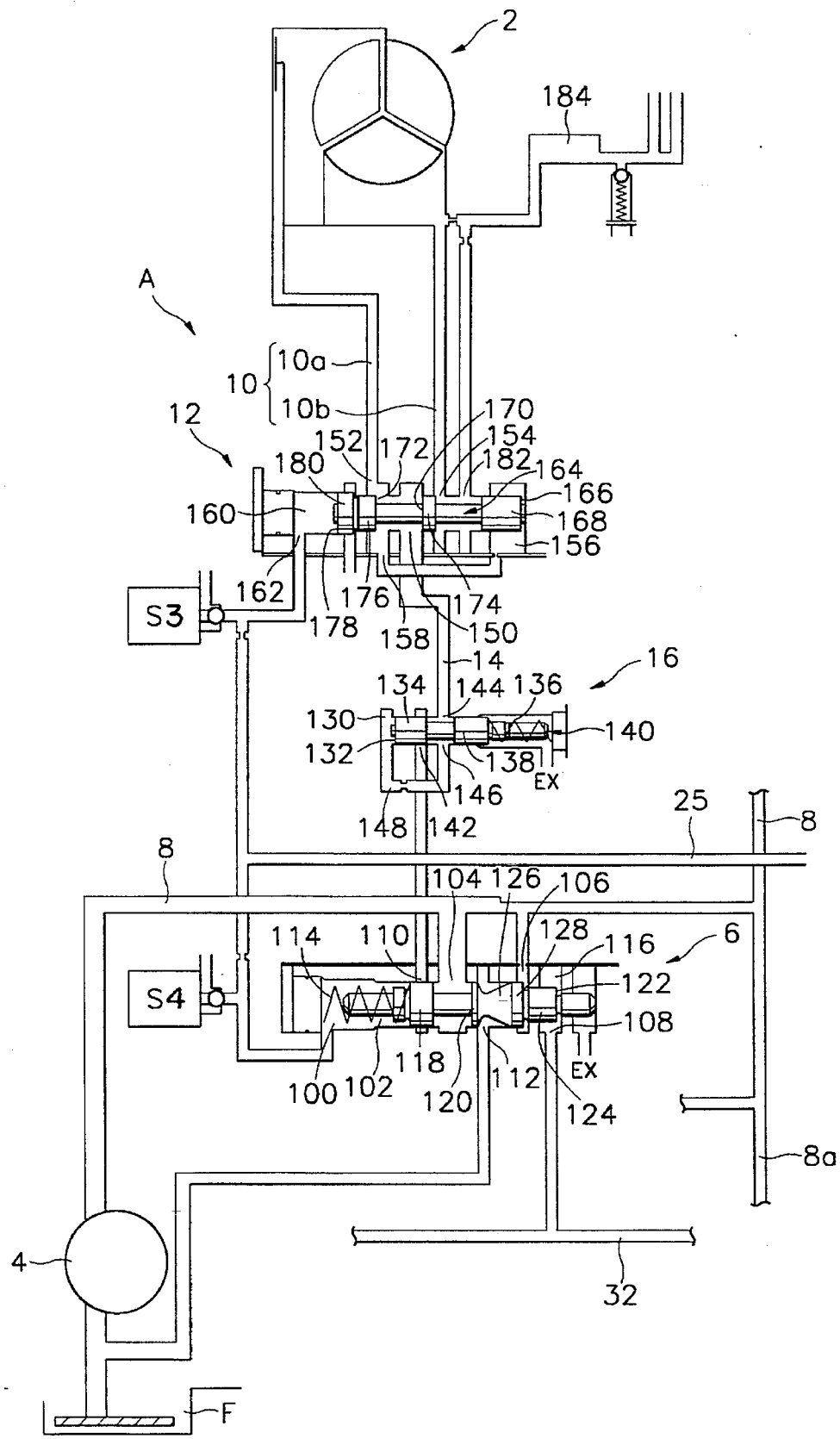
FIG. 2A is an enlarged view of a damper clutch control section of the hydraulic control system of FIG. 1.

Referring to FIG. 2A, the pressure regulating valve 6 of damper clutch control section A has a pressure chamber 100 and a spool 102. The pressure regulating valve 6 has first and second ports 104 and 106 directly communicating with the line pressure conduit 8, a third port 108 communicating with the drive pressure conduit 32 such that drive pressure is applied thereto, a fourth port 110 communicating with the converter feed valve 16, and a fifth port 112 for reducing the line pressure when the line pressure is increased too high.

The spool 102 is elastically biased rightward by an elastic member 114 disposed in the pressure chamber 100 which is supplied with hydraulic pressure according to ON/OFF operation of the fourth solenoid valve S4. Another pressure chamber 116 receives drive pressure via a third port 108, and the hydraulic pressure in this pressure chamber 116 acts against the hydraulic pressure in pressure chamber 100 such that the spool 102 is displaced according to the ON/OFF operation of the third solenoid valve S3.

When the fourth solenoid valve S4 is controlled to an OFF state and hydraulic pressure in pressure chamber 100 is increased, the spool 102 is displaced rightward because a sum of forces exerted by the hydraulic pressure in the pressure chamber 100 and elastic member 114 becomes larger than that exerted by hydraulic pressure in the pressure chamber 116. On the contrary, when the fourth solenoid valve S4 is controlled to an ON state and hydraulic pressure in the pressure chamber 100 is decreased, the spool 102 is displaced leftward because the force exerted by the elastic member 114 becomes smaller than that exerted by hydraulic pressure in the pressure chamber 116.

This displacement of the spool 102 makes lands of the spool 102 open or close first, second, third, fourth and fifth ports 104, 106, 108, 110 and 112, respectively.

The spool 102 includes a first land 118 for opening or closing the fourth port 110, a second land 120 for opening or closing the fifth port 112, and a third land 124 which has a pressure face 122 against which the hydraulic pressure in the pressure chamber 116 is applied. A fourth land 128 having an inclined face 126 is integrally formed between the second land 120 and third land 124. The inclined face 126 prevents hydraulic pressure from being exhausted abruptly when exhausting hydraulic pressure through the fifth port 112, an exhaust port, in case hydraulic pressure coming through the first port 104 is increased.

Converter feed valve 16 which receives hydraulic pressure from the fourth port 110 includes a spool 140 having a first land 134 with a pressure face 132 against which hydraulic pressure in the pressure chamber 130 is applied and a second land 138 biased by an elastic member 136.

The first land 134 opens or closes a first port 142 which communicates with the fourth port 110 of the pressure regulating valve 6 to obstruct hydraulic pressure flowing through a second port 144, selectively. This operation is performed by means of pressure variation within the pressure chamber 130 which communicates with a bypass conduit 148 at a third port 146.

When hydraulic pressure within the pressure chamber 130 is decreased, the spool 140 is displaced leftward by the elastic member 136 such that first and second ports 142 and 144 are opened. On the contrary, when the hydraulic pressure within the pressure chamber 130 is increased and it overcomes the elastic force by elastic member 136, the spool 140 is displaced rightward such that these ports 142 and 144 are closed.

The converter clutch regulator valve 12 which receives hydraulic pressure from the converter feed valve 16 includes a first port 150 communicating with the conduit 14, second and third ports 152 and 154 communicating with the torque converter 2, a fourth port 158 for bypassing hydraulic pressure coming through the first port 150 to pressure chamber 156, and a fifth port 162 for supplying hydraulic pressure to another pressure chamber 160 which receives hydraulic pressure from the control conduit 24.

A spool 164 of the converter clutch regulator valve 12 includes a first land 168 having a pressure face 166 against which hydraulic pressure in the pressure chamber 156 is applied, second and third lands 174 and 176 having pressure faces 170 and 172 against which hydraulic pressure coming through the first port 150 is applied, and a fourth land 180 having a pressure face 178 against which hydraulic pressure in the pressure chamber 160 is applied.

Hydraulic pressure in the pressure chamber 160 is obstructed according to ON/OFF control of the third solenoid valve S3, selectively, to displace the spool 164 leftward or rightward and to open or close the ports.

A sixth port 182 is located adjacent to the third port 154. Hydraulic pressure exhausted through this sixth port 182 is cooled down as it passes through a cooler 184 and is supplied to a power train part where the shift stage friction element section C is located and to an axle of the vehicle to provide lubrication for these parts.

Referring to FIG. 2B illustrating the torque pressure conversion section B, the solenoid supply valve 18 includes a first port 186 through which line pressure supplied from the conduit 8 is supplied, a second port 188 which communicates with the first port 186 selectively and communicates with the conduit 20, and a third port 192 which receives hydraulic pressure from the conduit 20 and supplies hydraulic pressure to a pressure chamber 190.

Also, the solenoid supply valve 18 includes a spool 200 having a first land 194 on which hydraulic pressure in the pressure chamber 190 is applied and second and third lands 196 and 198 which open or close the first and second ports 186 and 188. The spool 200 is biased by an elastic member 202 which acts against hydraulic pressure in the pressure chamber 190.

The elastic member 202 Is disposed between the third land 198 and a pushing plate 204. A screw 206 for adjusting the elastic force exerted by the elastic member 202 acting against hydraulic pressure in the pressure chamber 190 is abutted against pushing plate 204.

A branch conduit 118 is branched off from the conduit 20 to transmit a portion of pressurized fluid of the control pressure to the first-to-second shift valve 36. The torque control regulator valve 22 which receives the control pressure from an extension of conduit 20 includes a first port 222 connected to a pressure chamber 220 which communicates with conduit 20, a second port 224 connected to the drive pressure conduit 32, and third and fourth ports 226 and 228 connected to the first-to-second shift valve 36.

A fourth port 228 of the torque converter regulator valve 22 communicates with a pressure chamber 230. A first spool 232 is positioned beside the pressure chamber 230 to open or close second, third and fourth ports 224, 226 and 228, and a second spool 234 Is positioned beside the pressure cheer 220 to open or close the first port 222.

The first spool 232 has a cup-shaped plug 236 and a first land 238, and the second spool 234 has a cup-shaped plug 240 disposed coaxial with the first spool 232. These cup-shaped plugs 236 and 240 are biased by first and second elastic members 242 and 244, respectively.

The second elastic member 244 is disposed between the plug 240 and first land 238 and is compressed when hydraulic pressure in the pressure chamber 220 is applied on a backside of plug 240 to influence displacement of the first spool 232.

That is, the first elastic member 242 is compressed when compression force of the second elastic member 244 is applied on the first spool 232 to displace the first spool 232 leftward in FIG. 2B, and, for this, an elastic force of the second elastic member 244 is made larger than that of the first elastic member 242.

Figure 2C:
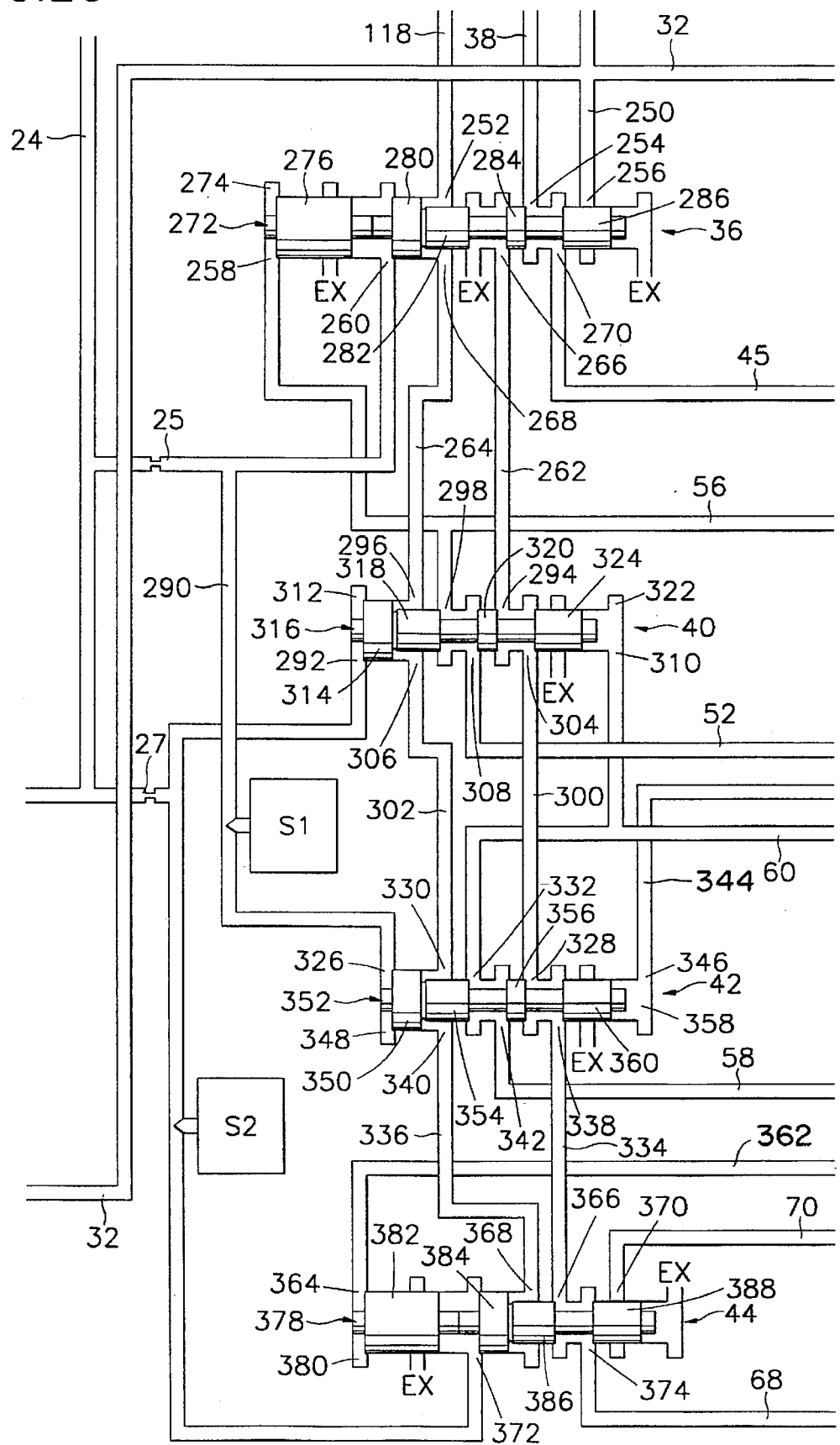
FIG. 2C is an enlarged view of a first shift control section of the hydraulic control system of FIG. 1.

Referring to FIG. 2C illustrating the first shift control section D, the first-to-second shift valve 36 includes a first port 252 communicating with the control pressure conduit 118, a second port 254 communicating with the torque pressure conduit 38, a third port 256 communicating with a conduit 250 branched from the drive pressure conduit 32, a fourth port 258 communicating with the conduit 56 of the third clutch valve 50, a fifth port 260 communicating with the control pressure branch conduit 25, sixth and seventh ports 266 and 268 communicating with conduits 262 and 264 to supply torque pressure and control pressure to the second-to-third shift valve 40, respectively, and an eighth port 270 connected to the second clutch valve 48 via the conduit 45 to supply hydraulic pressure thereto.

A spool 272 of the first-to-second shift valve 36 includes a first land 276 against which hydraulic pressure in a pressure chamber 274 is applied, a second land 280 which together with first land 276 regulates an opening degree of the fifth port 268, and a third land 282 which together with second land 280 regulates opening degrees of first and seventh ports 252 and 268, a fourth land 284 which makes the second port 254 communicate with sixth or eighth ports 266 or 270, and a fifth land 286 which makes the third port 256 communicate with the eighth port 270, selectively.

The first land 276 has a pressure face larger than that of the other lands such that the spool 272 can be displaced leftward by hydraulic pressure in the pressure chamber 274. Drive pressure from the third clutch valve 50 is supplied to the pressure chamber 274, selectively. The spool 272 is divided into two parts between the first and second lands 276 and 280 such that these parts are separated from each other when hydraulic pressure of a predetermined level is supplied through the fifth port 260.

The second-to-third shift valve 40 which receives hydraulic pressure from the control conduit 27 includes a first port 292 which communicates with the control conduit 27, second and third ports 294 and 296 which receive hydraulic pressure from the sixth and seventh ports 270 of the first-to-second shift valve 36, a fourth port 298 which receives drive pressure from the third clutch valve 66 through conduit 56, fifth and sixth ports 304 and 306 which communicate with conduits 300 and 302 to supply torque pressure and control pressure to the third-to-fourth shift valve 42, a seventh port 308 communicating with the third clutch valve 50 via conduit 52 to supply hydraulic pressure, and an eighth port 310 through which drive pressure from the fourth band valve 66 is supplied via the conduit 60.

The second-to-third shift valve 40 has a pressure chamber 312 which receives hydraulic pressure through an orifice of a control conduit 27. Hydraulic pressure in the pressure chamber 312 is increased or decreased according to an ON/OFF operation of the second solenoid valve 82.

A spool 316 of the second-to-third shift valve 40 includes a first land 314 against which hydraulic pressure in the pressure chamber 312 is applied, a second land 318 which regulates opening degrees of third and sixth ports 296 and 306 and opens or closes fourth and seventh ports 298 and 308, a third land 320 which enables the second and fifth ports 294 and 304 to communicate with each other, selectively, and a fourth land 324 against which hydraulic pressure in the pressure chamber 332 is applied.

The third-to-fourth shift valve 42 which receives hydraulic pressure from a branch conduit 290 of the control conduit 25 includes a first port 326 communicating with branch conduit 290, second and third ports 328 and 330 which receive hydraulic pressure from the fifth and sixth ports 304 and 306 via conduits 300 and 302, respectively, a fourth port 332 connected via conduit 60 to the fourth band valve 66 to receive drive pressure, fifth and sixth ports 338 and 340 communicating with conduits 334 and 336 through which torque pressure and control pressure are supplied to the fourth-to-fifth shift valve 44, a seventh port 342 through which hydraulic pressure is supplied to the fourth band valve 66 via the conduit 58, and an eighth port 346 which communicates with conduit 344 connected to the third clutch valve 50.

The third-to-fourth shift valve 42 has a pressure chamber 348 which receives hydraulic pressure through the control conduit 290. Hydraulic pressure in the pressure chamber 348 is increased or decreased according to an ON/OFF operation of the first solenoid valve S1.

The spool 352 of the third-to-fourth shift valve 42 includes a first land 338 against which hydraulic pressure in the pressure chamber 348 is applied, a second land 354 which regulates opening degrees of third and sixth ports 330 and 340 and makes fourth and seventh ports 332 and 342 communicate with each other, selectively, a third land 356 which makes second and fifth ports 328 and 338 communicate with each other, selectively, and a fourth land 360 against which hydraulic pressure in the pressure chamber 358 applied.

The fourth-to-fifth shift valve 44 includes a first port 364 communicating with the fourth band valve 66 via a conduit 362, second and third ports 366 and 368 connected to fifth and sixth ports 338 and 340 of third-to-fourth shift valve 42 via conduits 334 and 336 to receive torque pressure and control pressure, respectively, a fourth port 370 connected to the over-drive unit valve 76 via the conduit 70 to receive drive pressure, a fifth port 372 communicating with the control conduit 27 to receive control pressure, a sixth port 374 connected to the over-drive unit valve 76 via the conduit 68 to supply torque pressure or drive pressure.

A spool 378 of the fourth-to-fifth shift valve 44 includes a first land 382 on which hydraulic pressure in a pressure chamber 380 is applied, a second land 384 which together with first land 382 regulates opening degrees of the fifth port 372 and against which hydraulic pressure coming through the third port is applied, a third land 386 which enables the second and sixth ports 366 and 374 to communicate with each other, selectively, and a fourth land 388 which enables the fourth and sixth ports 370 and 374 to communicate with each other, selectively.

The first land 382 has a pressure face larger than that of the other lands such that the spool 378 can be displaced rightward by hydraulic pressure in the pressure chamber 380. The spool 378 is divided into two parts between the first and second lands 382 and 384 such that these parts are separated from each other when hydraulic pressure of a predetermined level is supplied through the fifth port 370. Hydraulic pressure is supplied to the pressure chamber 380 according to an ON/OFF operation of the fourth solenoid valve S4.

Referring to FIG. 2D illustrating the second shift control section E, second clutch valve 48 includes a first port 390 communicating with the conduit 45 which is connected to the eighth port 270 Of the first-to-second shift valve 36, a second port 394 connected to a conduit 392 which is branched off in two ways and connected to the second friction element 46 and third clutch valve 50, a third port 398 which, through a conduit 454 and the third clutch valve 50, receives hydraulic pressure supplied along a conduit 396 connected to the manual valve 30 to activate the ninth friction element 82 when the shift lever is selected to the "2", "L" or "R" ranges, a fourth port 402 connected to conduit 400 to supply the hydraulic pressure to the ninth friction element 82, and a fifth port 406 connected to conduit 404 to activate the fourth friction element 62 when the shift lever is selected to "2" range.

A spool 412 includes a first land 410 against which hydraulic pressure in the pressure chamber 408 is applied directly and second and third lands 414 and 416 which enable hydraulic pressure supplied from the third port 398 to be transmitted through fourth or fifth ports 402 or 406, selectively. A spool 412 is biased by an elastic member 418 to prevent the spool 412 from being abruptly displaced by hydraulic pressure in the pressure chamber 408 applied against the first land 410.

Hydraulic pressure from the fourth port 402 can be supplied to the ninth friction element 82 through the conduit 400. Two check valves 420 and 422 of opposite flow directions and a shuttle valve 426 which prevents hydraulic pressure from being supplied from the reverse clutch inhibiter valve 26 to the eighth friction element 78 via a conduit 424 from being reversely flowing toward conduit 424 are installed in conduit 400.

The reverse clutch inhabiter valve 26 includes a first port 428 which receives hydraulic pressure from the reverse pressure conduit 80, a second port 430 which supplies reverse pressure to the ninth friction element 82 via conduit 424, and third and fourth ports 434 and 436 connected via a bypass conduit 432. A spool 442 can be displaced by hydraulic pressure in a pressure chamber 444 which is regulated according to an ON/OFF operation of the fifth solenoid valve S5 and applied on a first land 446.

The spool 442 has second and third lands 448 and 450 which have cross sections smaller than that of the first land 446, and hydraulic pressure flowing through the first and second ports 446 and 440 is applied against the second and third lands 448 and 450.

The third clutch valve 50 includes a first port 452 to which conduit 52 communicating with the second-to-third shift valve 40 is connected, second and third ports 454 and 456 which communicate with third and second ports 398 and 394 of the second clutch valve 48, a fourth port 460 connected to a branch conduit 458 branched off from the drive pressure conduit 32, a fifth port 462 which receives hydraulic pressure from the conduit 396 connected to the manual valve 30, a sixth port 464 communicating with the conduit 56 of the second-to-third shift valve 40, a seventh port 468 communicating with a conduit 466 connected to the third friction element 54 and the fourth band valve 66, an eighth port 470 communicating with the fourth port 346 of the third-to-fourth shift valve 42 via the conduit 344, and a ninth port 474 connected with the fourth band valve 66 via conduit 472.

A spool 480 includes a first land 478 against which hydraulic pressure in pressure chamber 476 is applied, a second land 484 which enables the second and fifth ports 454 and 462 to communicate with each other, selectively, a third land 486 which enables the fourth port 460 to communicate with eighth and ninth ports 470 and 474, selectively, and a fourth land 488 which enables third and sixth ports 456 and 464 to communicate with each other, selectively. The first land 478 supplies hydraulic pressure through the first port 452 to the seventh port 468, selectively. The spool 480 is biased by elastic member 482 to prevent the spool. 480 from being abruptly displaced by hydraulic pressure in the pressure chamber 476 applied against the first land 478.

The fourth band valve 66 which receives hydraulic pressure from the manual valve 30 via the conduit 490 when the shift lever is selected to "3", "2" or "L" ranges includes a first port 492 connected to the conduit 58 which communicate with the third-to-fourth shift valve 42, a second port 494 communicating With the seventh port 474 of third clutch valve 50 via the conduit 472, a third port 496 communicating with the conduit 466 through which hydraulic pressure is supplied to the third friction element 54, a fourth port 498 which receives hydraulic pressure from the conduit 490 connected to the manual valve 30, a fifth port 500 communicating with the fourth port 332 of the third-to-fourth shift valve 42 via the conduit 60, a sixth port 504 communicating with the fourth friction element 62 via a conduit 502 to supply hydraulic pressure thereto, a seventh port 508 connected to the fifth friction element 64 via a conduit 506 to supply hydraulic pressure thereto, and an eighth port 510 Communicating with the first port 364 of the fourth-to-fifth shift valve 44 via a conduit 509.

A spool 516 of the fourth band valve 66 includes a first land 514 against which hydraulic pressure in the pressure chamber 512 is applied, a second land 520 which enables the seventh and fourth ports 508 and 498 to communicate with each other, selectively, a third land 522 which enables the second and eighth ports 494 and 510 to communicate with each other, selectively, and a fourth land 524 which enables the third and fifth 496 and 500 ports to communicate with each other, selectively. The first land 514 enables hydraulic pressure to be supplied through the first port 492 to sixth port 504, selectively. The spool 516 is biased by the elastic member 518 to prevent the spool 516 from being abruptly displaced by hydraulic pressure in the pressure chamber 512 applied against the first land 514.

Hydraulic pressure is supplied to the fourth friction element 62 through the conduit 502 at the fourth and fifth speed of the "D" range. A shuttle valve 526 is installed in the conduit 502 to prevent hydraulic pressure from flowing in a reverse direction through the conduit 502 when hydraulic pressure supplied to the fourth friction element 62 through the conduit 404 at the "2" range.

The over-drive unit valve 76 supplies hydraulic pressure to the sixth friction element 72 which is activated at all of the speed ranges except the "P" range and a fifth speed of the "D" range and to the seventh friction element 74 which is activated at the fifth speed of the "D" range only. This over-drive unit valve 76 includes a first port 532 through which hydraulic pressure from the fourth-to-fifth shift valve 44 is supplied to a pressure chamber 530 via conduit a second port 536 through which hydraulic pressure coming through the first port 532 is supplied to the seventh friction element 72 via conduit 534, a third port 538 which receives hydraulic pressure from a conduit 8a branched off from the conduit 8 connected to the manual valve 30, a fourth port 542 through which hydraulic pressure coming through the third port 538 is supplied to the sixth friction element 72 via conduit 540, a fifth port 544 communicating with the fourth port 370 of the fourth-to-fifth shift valve 44 via conduit 70, and a sixth port 546 communicating with the conduit 502 through hydraulic pressure supplied to a fourth friction element.

A spool 550 includes a first land 548 against which hydraulic pressure in the pressure chamber 530 is applied, a second land 554 which enables the third and fourth ports 538 and 542 to communicate with each other, selectively, and a third land 556 which enables the sixth and fifth ports 546 and 544 to communicate with each other, selectively. The first land 548 enables hydraulic pressure to be supplied through the first port 532 to the second port 536, selectively. The spool 550 is biased by an elastic member 552 to prevent the spool 550 from being abruptly displaced by hydraulic pressure in the pressure chamber 530 applied against the first land 548.

In the automatic transmission system as described above, fluid from an oil pan F is exhausted from the hydraulic pump 4 as the driven gear of the pump is rotated.

The fluid is transmitted to the torque control regulator valve 22 through the solenoid supply valve 18. Hydraulic pressure flowing through the control conduit 24 branched from the conduit 20 acts as the control pressure for the pressure regulating valve 6 and converter clutch regulator valve 12. A portion of the pressurized fluid is transmitted to the first-to-second, second-to-third, third-to-fourth and fourth-to-fifth shift valves 36, 40, 42 and 44 of the first shift control section D.

Also, a portion of the pressurized fluid exhausted from the hydraulic pump 4 is transmitted to the manual valve 30 along the conduit 8a connected to conduit 8. This flow of pressurized fluid is obstructed at the manual valve 30 when the shift lever is selected to the neutral range.

If the shift lever is selected to the drive range at this state, line pressure in the conduit 8 is regulated by the fourth solenoid valve S4 which is duty-controlled by the TCU.

If a slip occurs at friction elements related to speed shifting, the fourth solenoid valve S4 is controlled to an OFF state which causes hydraulic pressure in the pressure chamber 100 of the pressure regulating valve 6 to increase as shown in FIG. 2A. Then a sum of forces exerted by the hydraulic pressure and elastic member 114 is applied against the first land 118 and, thus, displaces spool 102 rightward in FIG. 2A.

However, if no slip occurs at the friction elements related to the speed shifting, the fifth solenoid valve II S5 is duty-controlled which causes exhaustion of the hydraulic pressure in pressure chamber 100. Then, spool 102 is displaced leftward in FIG. 2A by hydraulic pressure applied against a right side of the third land 124.

Then, the second land 120 of spool 102 becomes located between the first port 104 and fifth port 112, an exhaust port, to cause these ports 104 and 112 to communicate with each other, and fluid in conduit 8 is returned back to the oil pan F.

Driving loss of the hydraulic pump can be minimized by this returning of the fluid. At this moment, if a slip occurs again at friction elements related to speed shifting, the fourth solenoid valve S4 is controlled to the OFF state which causes the hydraulic pressure in the pressure chamber 100 of pressure regulating valve 6 to increase. Then, spool 102 is displaced rightward to obstruct the fifth port 112, the exhaust port, and make the hydraulic pressure in the conduit 8 act as an activating pressure for the friction elements.

This operation is repeated continuously according to the fact that the slip occurs or not, and, in this process, the first port 104 becomes in communication with the fourth port 110 such that the line pressure in conduit 8 is transmitted to the first port 142 of the converter feed valve 16.

Because the spool 140 of the converter feed valve 16 is biased by the elastic member 136 and displaced rightward slightly in Pig. 2A such that the first port 142 is kept partially opened, hydraulic pressure flowing through the first port 142 is exhausted through the second port 144 and a portion of pressurized fluid is transmitted to the pressure chamber 130 through bypass conduit 148.

The hydraulic pressure flowing into the pressure chamber 130 displaces the spool 140 rightward to obstruct hydraulic pressure flowing out through the second port 144. According to this operation, damper clutch control pressure and lubricant control pressure are controlled.

Hydraulic pressure flowing through the first port 144 is supplied to the first port 150 of the converter clutch regulator valve 12 and flows through conduit 10a or 10b.

Selection of conduit 10a or 10b is performed according to ON/OFF control of the third solenoid valve S3. In a range where the damper clutch is activated, the third solenoid valve S3 is controlled to an ON state by the TCU to decrease hydraulic pressure in the pressure chamber 160. Then, a portion of pressurized fluid coming through the first port 150 is transmitted to the pressure chamber 156 located at the right side of the spool 164 through the fourth port 158. In this state, hydraulic pressure supplied from the conduit 14 and applied against the pressure face 172 of the second land 174 simultaneously acts against the hydraulic pressure transmitted to the pressure chamber 156. Accordingly, the spool 164 is displaced leftward in FIG. 2A under the application of hydraulic pressure against the pressure face 166 of the first land 168.

As a result of this displacement of the spool 164, the second land 174 is located at a left side of the first port 150 and the first land 168 is located at a right side of the third port 154 such that the first port 150 communicates with the third port 154. Thus, hydraulic pressure coming through the first port 150 is transmitted to the torque converter 2 via the conduit 10b to activate the damper clutch.

On the contrary, in a range where the damper clutch is not activated, the third solenoid valve S3 is controlled to an OFF state by the TCU to increase hydraulic pressure in the pressure chamber 160 which is applied against the pressure face 178 of the fourth land 180.

Even though hydraulic pressure in the other pressure chamber 156 also is applied against the pressure face 166 of the first land 168, the spool 164 is displaced rightward because the cross section of the pressure face 178 of the fourth land 180 is larger than that of the pressure face 166 of the first land 168.

As a result of this rightward displacement of the spool 164, the second land 174 is located at a left side of the third port 154 to obstruct hydraulic pressure coming through the first port 150, and the second port 152 is partially opened by the third land 176 such that hydraulic pressure coming through the first port 150 is transmitted to conduit 10a via the second port 152.

Ranges where the damper clutch is activated or deactivated are detected by a sensor which outputs a signal to the TCU. The damper clutch is activated or deactivated by the third solenoid valve S3 which is ON controlled or OFF-controlled by this signal. These operations are performed at shift stages as explained below.

(First speed of the "D" range]

Figure 3:
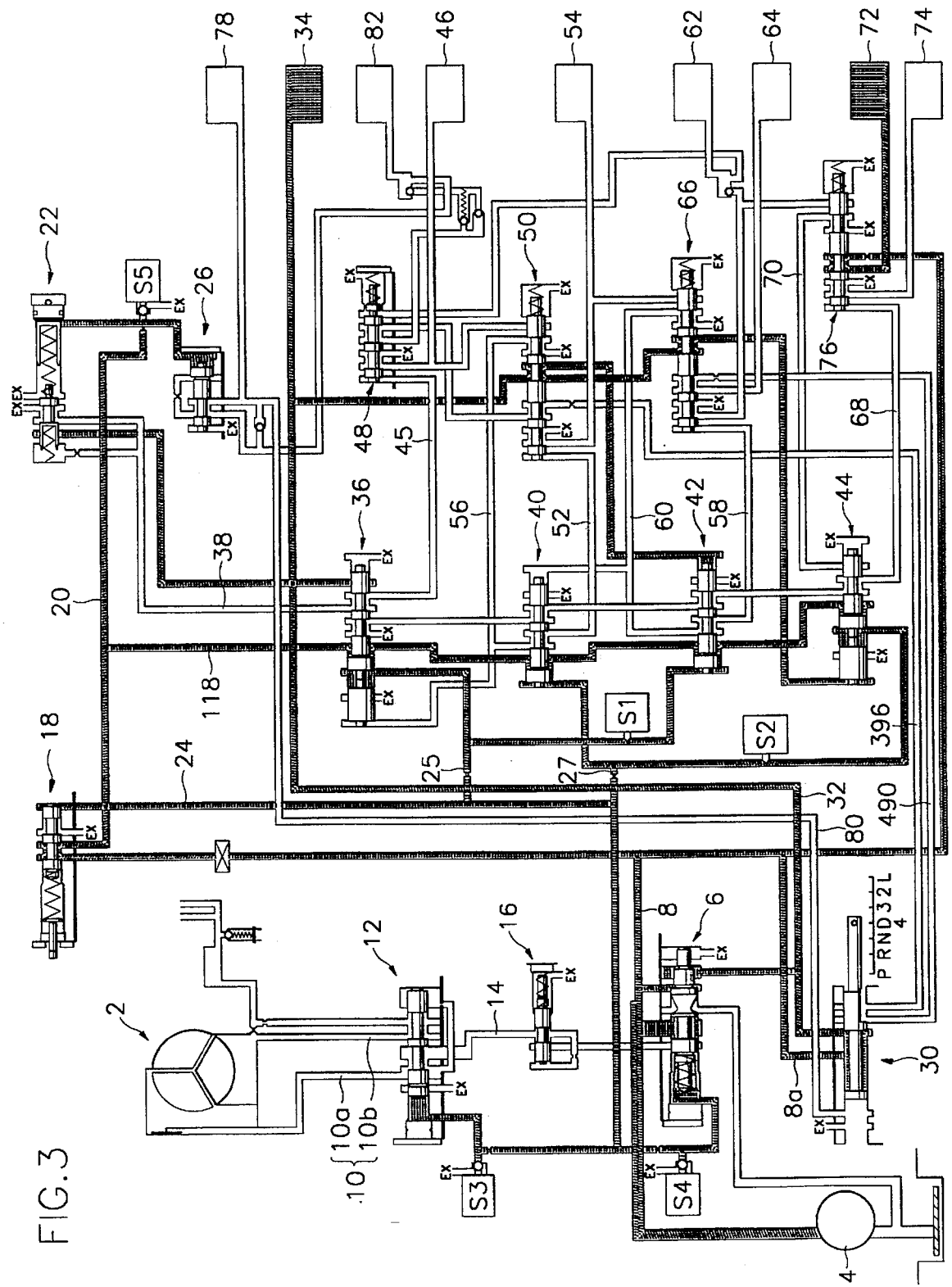
FIG. 3 is the hydraulic control system of FIG. 1 at a first speed of a "D" range.

Referring to FIG. 3 illustrating the hydraulic control system according to the invention at a first speed of the "D" range, a portion of pressurized fluid from the conduit 8 through which line pressure regulated by the pressure regulating valve 6 flows is used to activate or deactivate the damper clutch, and a remaining portion of the pressurized fluid is supplied to the solenoid supply valve 18 via the first port 186 thereof in the torque pressure conversion section and to the manual valve 30.

Because the first port 186 is partially opened by the third land 198 of the spool 200 which is displaced rightward by the elastic member 202, the line pressure comes in through this first port 186 and flows along the conduit 20 via the second port 188.

Hydraulic pressure transmitted through the third port 192 which communicates with the conduit 20 increases hydraulic pressure within the pressure chamber 190. If hydraulic pressure applied against the first land 194 overcomes the elastic force biasing the spool 200, the spool 200 is displaced leftward in FIG. 2B such that the second land 196 is located between the first port 186 and the second port 188 to obstruct fluid flow.

Hydraulic pressure which has passed through the solenoid supply valve 18 is supplied to the torque control regulator valve 22 and the first-to-second, second-to-third, third-to-fourth and fourth-to-fifth shift valves 36, 40, 42 and 44 via the conduit 20 and control conduit 24. As the fifth solenoid valve S5 is maintained to an OFF state, hydraulic pressure supplied to the torque control regulator valve 22 is applied to pressure chamber 220. Accordingly, torque pressure is supplied to the first-to-second shift valve 36, drive pressure in the drive pressure conduit 32 directly activates the first friction element 34, and hydraulic pressure flowing through conduit 8a is supplied to the third port 538 of the over-drive unit valve 76.

Because the spool 550 of the over-drive unit valve 76 is kept displaced leftward by the biasing force of elastic member 552, third and fourth ports 538 and 542 communicate with each other such that hydraulic pressure activates the sixth friction element 72 through the conduit 540. As a result, the first speed of the "DO" range and a preparation process for first-to-second speed shifting are performed (See FIG. 3).

[First-to-second shifting at the "D" range]

As the vehicle speed and the opening degree of the throttle position are increased at the first speed, the TCU controls the fourth solenoid valve S4 as described above and, simultaneously, controls the fifth solenoid valve S5 to an OFF state initially and then to an ON state gradually.

Then, in a state where the first and sixth friction elements 34 and 72 are activated as in the first speed, hydraulic pressure flowing through conduit 20 is supplied to the pressure chamber 220 of the torque control regulator valve 22. This hydraulic pressure overcomes elastic forces exerted by the elastic members 244 and 242 one by one and displaces the spool 232 leftward such that the second and third ports 224 and 226 communicate with each other and, thus, hydraulic pressure supplied to the drive pressure conduit 32 is transmitted to the first-to-second shift valve 36 through conduit 38.

Simultaneously, first and second solenoid valves S1 and S2 are controlled to ON states by the TCU. Hydraulic pressure supplied through the branch conduits 25 and 27 are exhausted, and hydraulic pressure flowing through conduit 118 branched off from conduit 20 is supplied to each shift valve 36, 40, 42 and 44 through conduits 264, 302 and 336 to keep spools 272, 316, 352 and 378 displaced leftward.

Because the eighth port 280 is opened by this leftward displacement of the spool 272, hydraulic pressure supplied to the second port 254 of the first-to-second shift valve 36 is supplied to the pressure chamber 408 of the second clutch valve 48 via conduit 45.

As torque pressure is transmitted to the pressure chamber 408 of the second clutch valve 48 via conduit 45 and first port 390, the spool 412 is displaced rightward such that first and second ports 390 and 394 communicate with each other and torque pressure activates the second friction element 46 via the conduit 392.

Hydraulic pressure supplied to the conduit 458 branched off from drive pressure conduit 32 is transmitted to the pressure chamber 358 of the third-to-fourth shift valve 42 via the fourth port 466 of the third clutch valve 50 and conduit 344.

Figure 4:
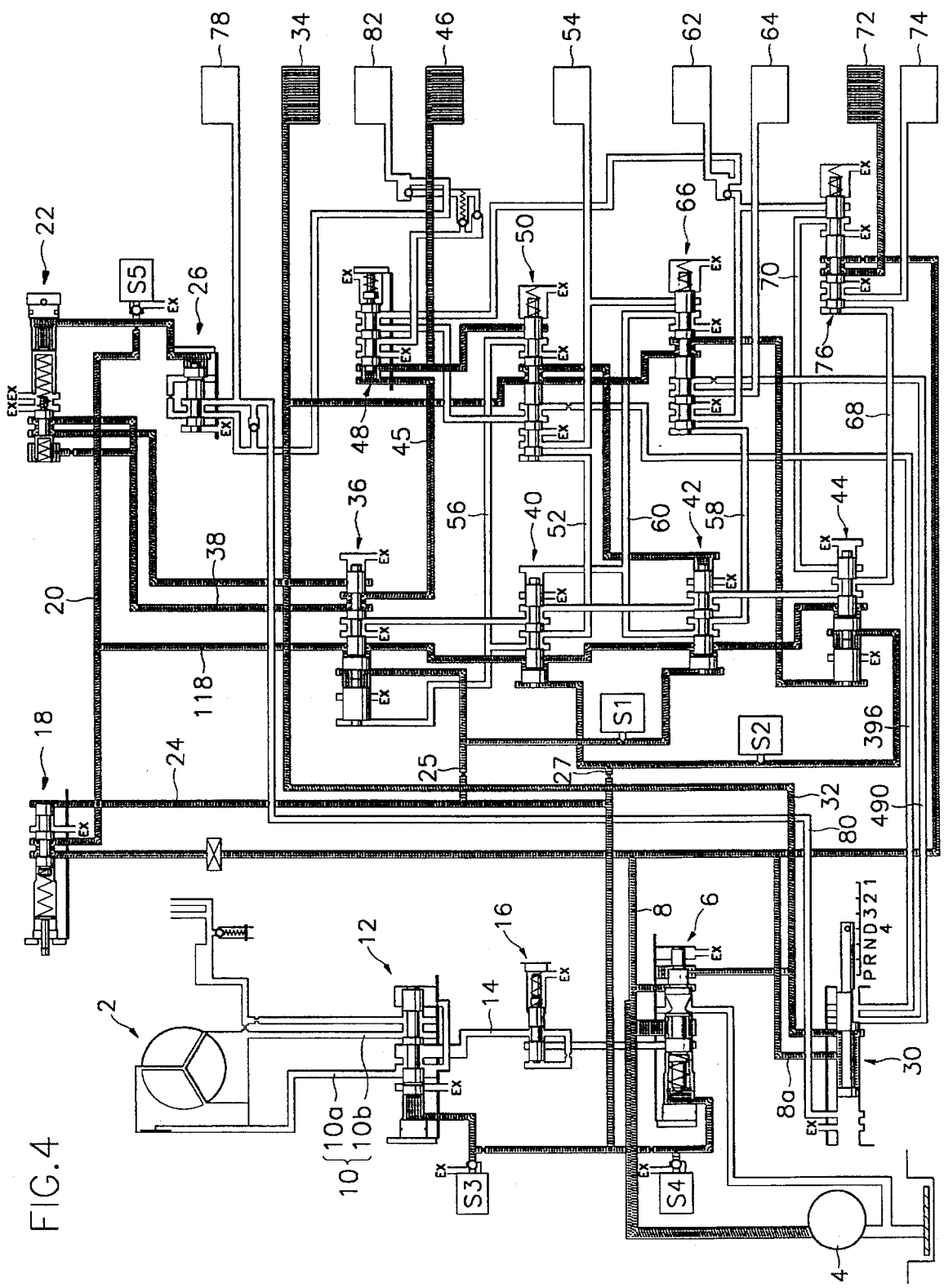
FIG. 4 is the hydraulic control system of FIG. 1 at a first-to-second speed shifting of the "D" range.

Thus, at the first-to-second speed shifting, second friction elements 72 together with first and sixth friction elements 34 and 72 which were activated at the first speed are activated to perform speed shifting (See FIG. 4).

[Second speed of the "D" range]

As the first-to-second speed shifting is completed by torque pressure, the first solenoid valve S1 which was controlled to an ON state by the TCU is controlled to an OFF state, second solenoid valve S2 to an ON state, and fifth solenoid valve S5 to an OFF state.

Then, control pressure flowing through the conduit 25 according to an OFF state control of the first solenoid valve S1 is increased very high and supplied between first and second lands 276 and 280 of the first-to-second shift valve 36 to separate the two parts of the spool 272 from each other and be displaced toward both sides, respectively.

Because this displacement of the spool 272 makes third and eighth ports 256 and 270 communicate with each other, torque pressure is supplied to the other shift valves 40, 42 and 44 and drive pressure is supplied to the second clutch valve 48 via the conduit 45 to activate the second friction element 46.

Figure 5:
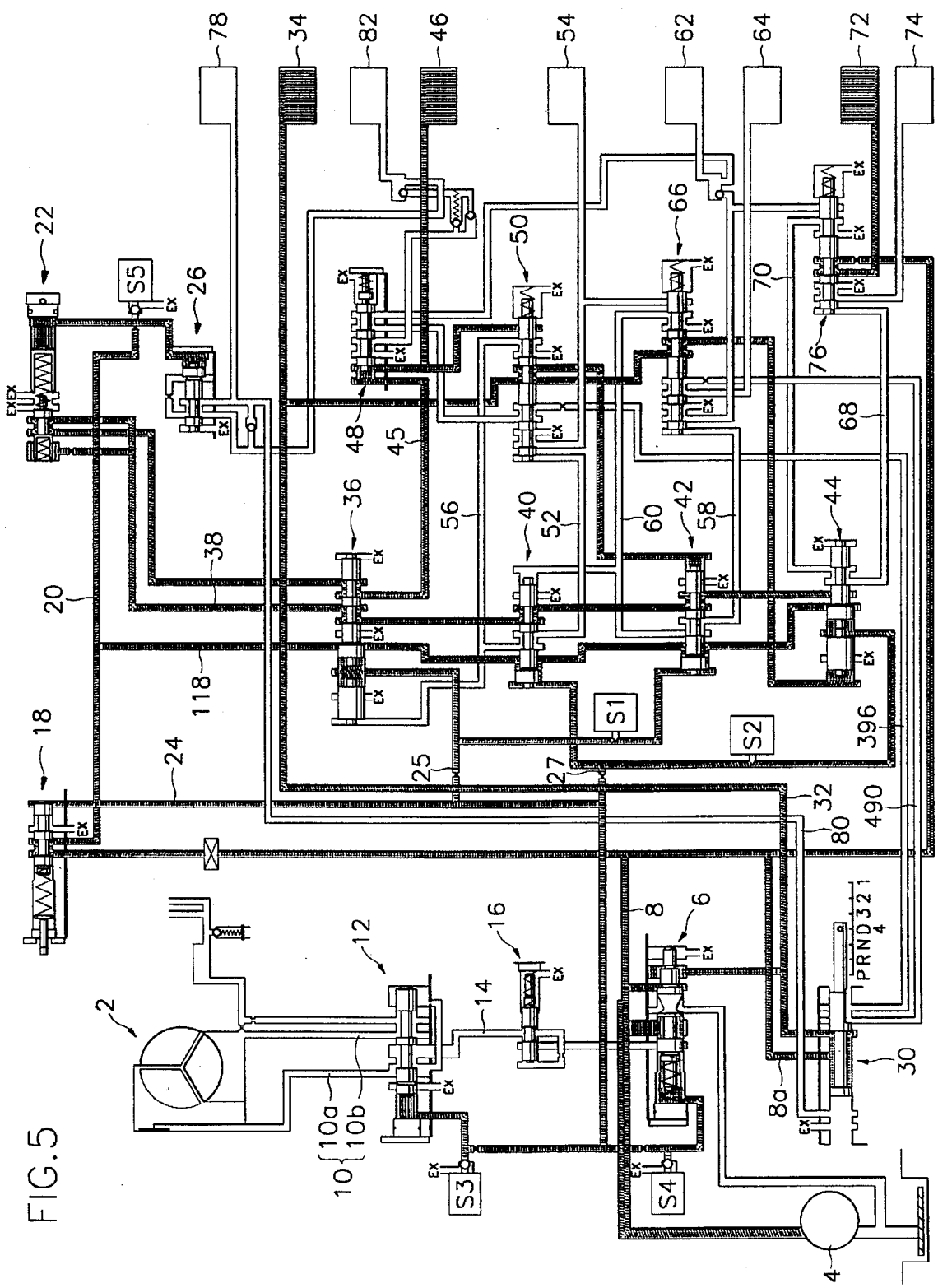
FIG. 5 is the hydraulic control system of FIG. 1 at a second speed of the "D" range.

Thus, the second speed is performed with the second friction element 46 activated by drive pressure instead of torque pressure (See FIG. 5).

[Second-to-third shifting at the "D" range]

As the vehicle speed and the opening degree of the throttle position are increased at the second speed, the TCU gradually controls the first solenoid valve S1 from the OFF state to the ON state, the second solenoid valve S2 to the OFF state, and, simultaneously, the fifth solenoid valve S5 to the ON state initially and then gradually to the OFF state.

Then, in a state where first, second and sixth friction elements 34, 46 and 72 are activated as have been in the second speed, the first solenoid valve S1 is controlled from the OFF state to the ON state and the second solenoid valve S2 tot he OFF state. As a result, hydraulic pressure in conduit 27 is increased and supplied to each of the shift valves 40 and 44 to displace spools 316 and 382 rightward.

Simultaneously, torque pressure from the torque control regulator valve 22 is supplied to third port 294 of the second-to-third shift valve 40 via conduits 38 and 262. Then, this torque pressure is supplied to the pressure chamber 476 of the third clutch valve 50 through the fifth port 304 communicating with the third port 294 and conduit 52.

Torque pressure supplied to the pressure chamber 476 of the third clutch valve 50 displaces the spool 480 rightward and first and seventh ports 452 and 468 communicate with each other. The third friction element 54 is activated by torque pressure supplied through conduit 392, and thus, second-to-third speed shifting is performed.

The rightward displacement of the spool 480 communicates the third and fifth ports 456 and 464 with each other. A portion of fluid of the drive pressure which is supplied to the conduit 392 through the second clutch valve 48 is passed through the conduit 56 and stays at the fourth port 298 of the second-to-third shift valve 40, and the remaining portion is supplied to the pressure chamber 274 Of the first-to-second shift valve 36 to maintain the spool 272 displaced rightward.

Figure 6:
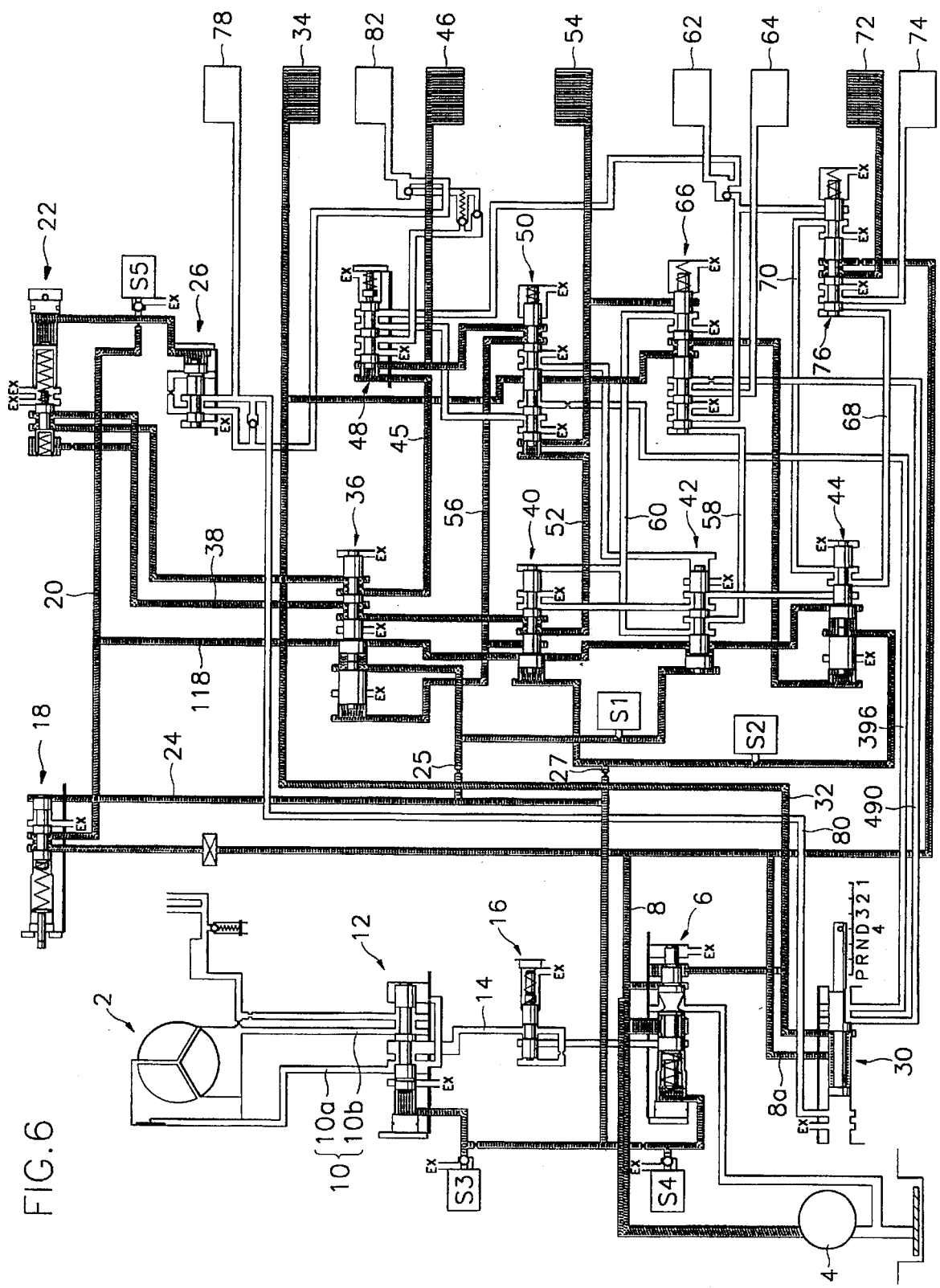
FIG. 6 is the hydraulic control system of FIG. 1 at a second-to-third speed shifting of the "D" range.

Accordingly, even though the first solenoid valve S1 is gradually controlled from the OFF state to the ON state, the spool 272 of the first-to-second shift valve 36 is kept from being displaced leftward (See FIG. 6).

[Third speed of the "D" range]

As the second-to-third speed shifting is performed, the TCU controls first and second solenoid valves S1 and S2 to an ON state to decrease hydraulic pressure supplied to each shift valve 36, 40, 42 and 44 and, simultaneously, keeps the fifth solenoid valve S5 in an OFF state.

Then, in a state where first, second, third and sixth friction elements 34, 46, 54 and 72 are activated, the spool 316 is displaced leftward as hydraulic pressure in the pressure chamber 312 of the second-to-third shift valve 40 is decreased. At this moment, the second port 294 is out of communication with the seventh port 308, and the fourth port 298 becomes communicated with the seventh port 308 to keep the third friction element 54 activated.

That is, the third friction element 54 is activated by drive pressure instead of torque pressure.

At this moment, torque pressure flowing through the third-to-fourth and fourth-to-fifth shift valves 42 and 44 because of the leftward displacement of spool 316 is obstructed as spool 378 of the fourth-to-fifth shift valve 44 is displaced rightward by drive pressure transmitted from the fourth band valve 66.

Figure 7:
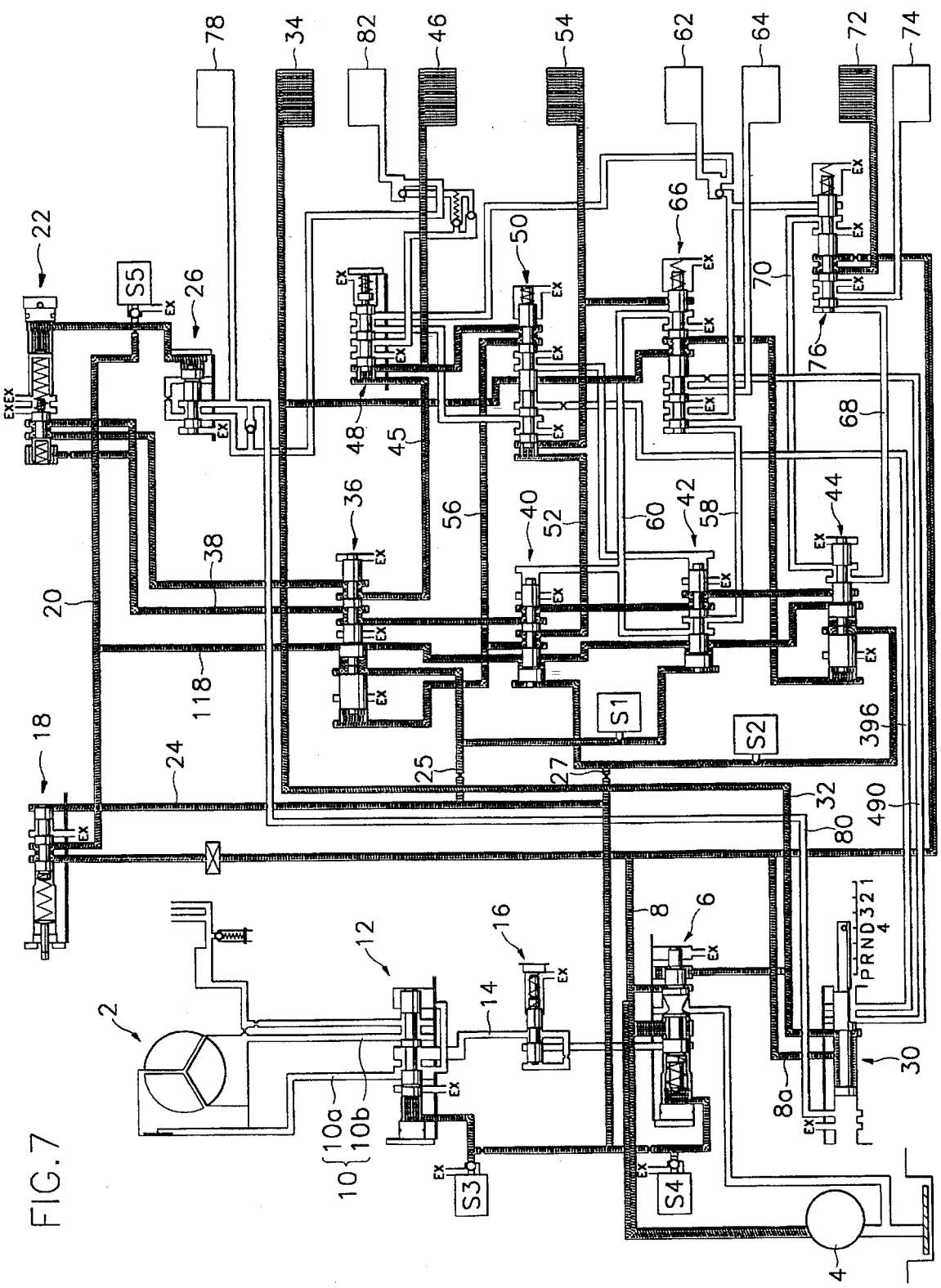
FIG. 7 is the hydraulic control system of FIG. 1 at a third speed of the "D" range.

Thus, the third speed is performed with first, second, third and sixth friction elements 34, 46, 54 and 72 activated (See FIG. 7).

[Third-to-fourth shifting at the "D" range]

As the vehicle speed and the opening degree of the throttle position are increased at the third speed, the TCU controls the first solenoid valve S1 to the OFF state, the second solenoid valve S2 from an initial ON state to an OFF state gradually, and, simultaneously, the fifth solenoid valve S5 to the ON state once and then to the OFF state gradually to gradually increase torque pressure.

Then, in a state where first, second, third and sixth friction elements 34, 46, 54 and 72 are activated as have been in the third speed, torque pressure from the torque control regulator valve 22 is supplied through conduits 38, 262 and 300 and stays at the second port 328 o f the third-to- fourth shift valve 42. Simultaneously, hydraulic pressure is supplied to the pressure chamber 348 of the third-to-fourth shift valve 42 to displace the spool 351 rightward and enable the second port 328 at which torque pressure stayed opened communicate with the seventh port 342.

This torque pressure is supplied along the conduit 58 to the pressure chamber 512 of the fourth band valve 66 to displace the spool 516 of the fourth band valve 66 rightward and make the first port 492 communicate with the sixth port 504 such that torque pressure supplied from the conduit 58 activates the fourth friction element 62 via the conduit 502.

The rightward displacement of the spool 516 of the fourth band valve 66 communicates the third and fifth ports 456 and 500 with each other such that a portion of fluid of drive pressure supplied to the conduit 466 is transmitted to the conduit 60 via these ports 456 and 500 and stays at the fourth port 332 of the third-to-fourth shift valve 42.

Figure 8:
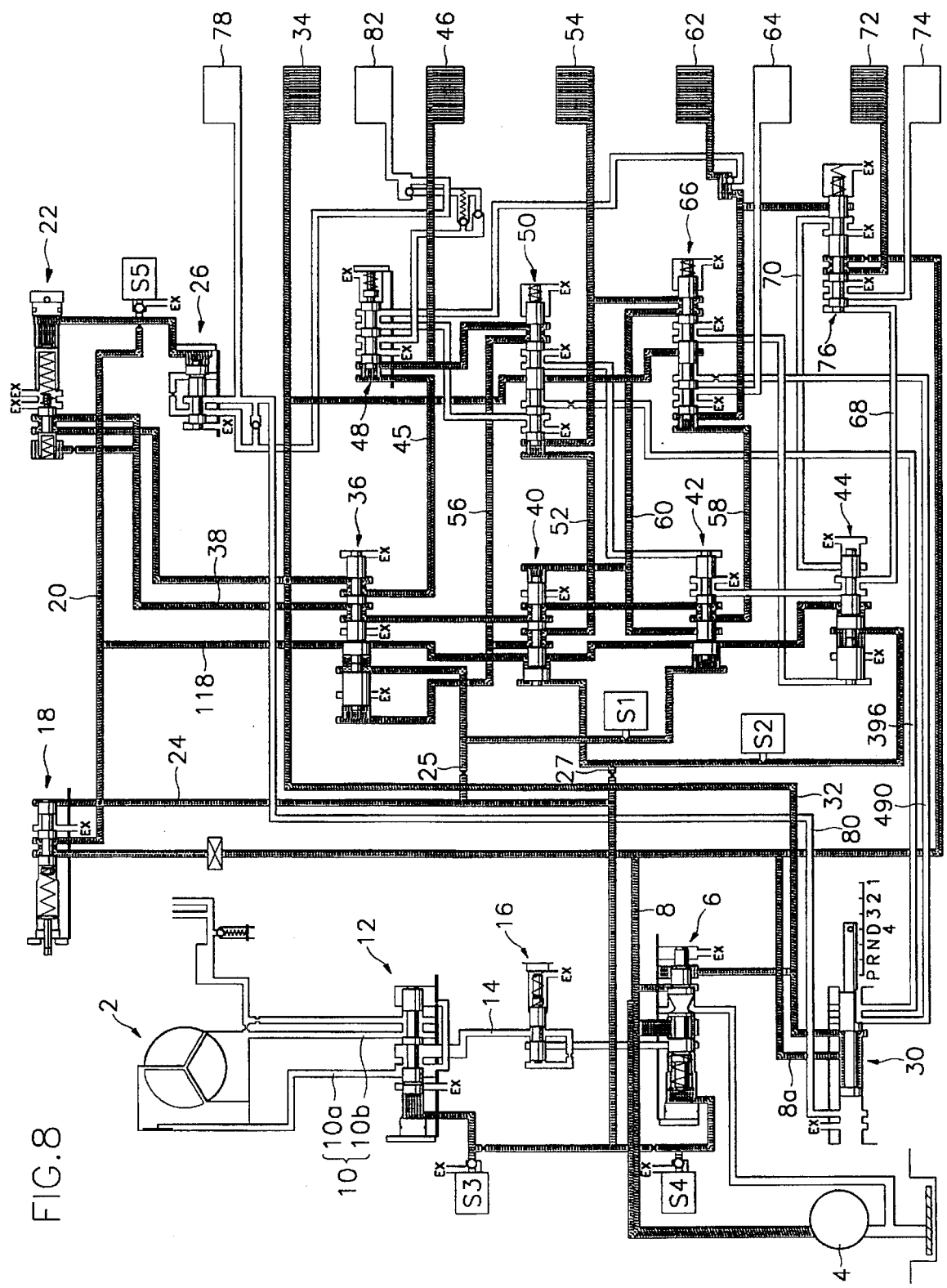
FIG. 8 is the hydraulic control system of FIG. 1 at a third-to-fourth speed shifting of the "D" range.

As described above, third-to-fourth speed shifting of the "D" range is performed with first, second, third, fourth and sixth friction elements 34, 46, 54, 62 and 72 activated (See FIG. 8).

[Fourth speed of the "D" range]

As the third-to-fourth speed shifting is performed, the TCU controls the first solenoid valve S1 to the ON state and the second solenoid valve S2 to an OFF state to exhaust hydraulic pressure in pressure chamber 348.

Then spool 352 is displaced leftward to prevent the second port 328 from communicating with the seventh port 342 and enable the fourth port 332 at which drive pressure communicates with the seventh port 342 such that the drive pressure is supplied along conduit 58 to keep the fourth friction element 62 activated.

Figure 9:
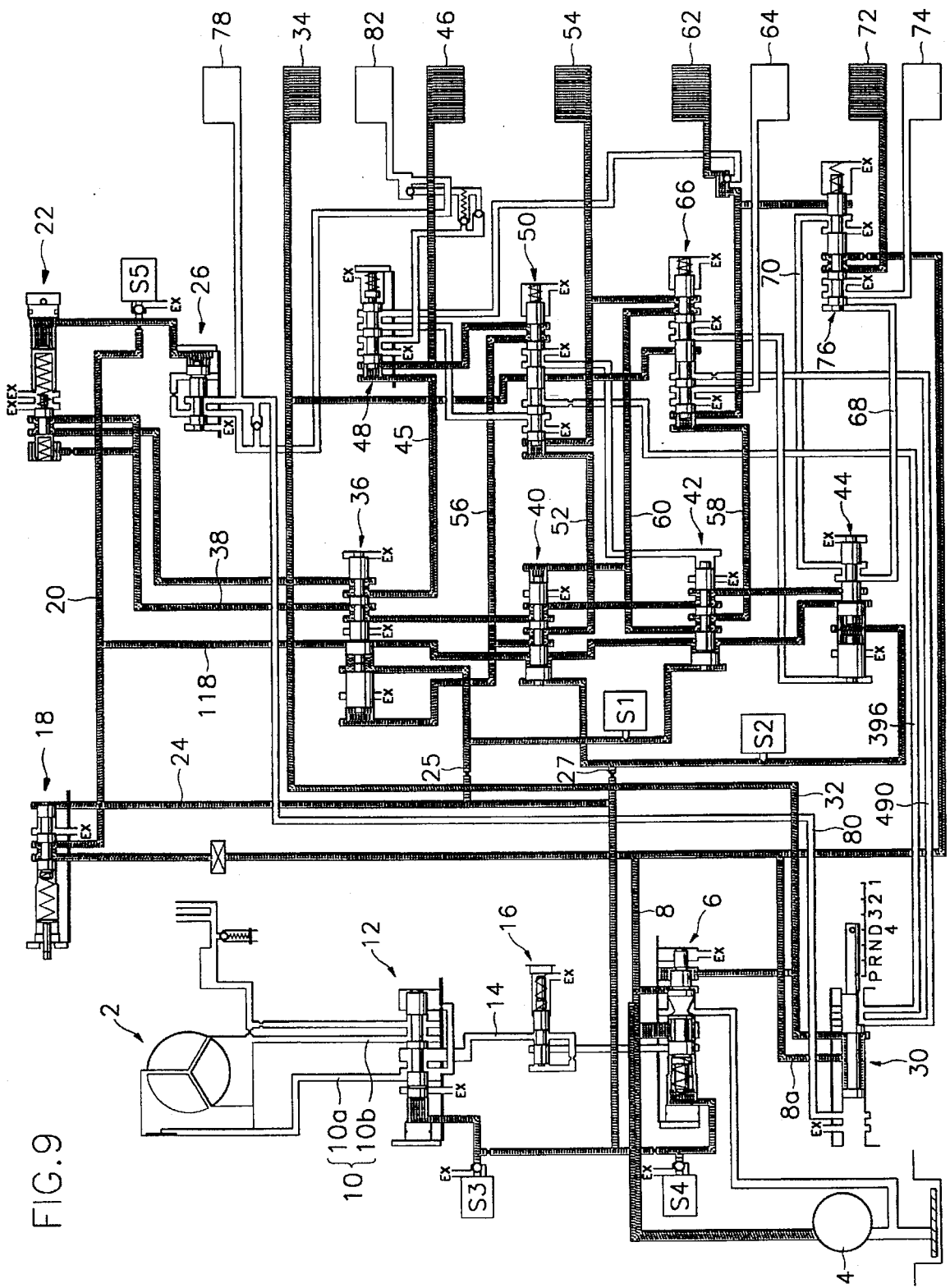
FIG. 9 is the hydraulic control system of FIG. 1 at a fourth speed of the "D" range.
Figure 10:
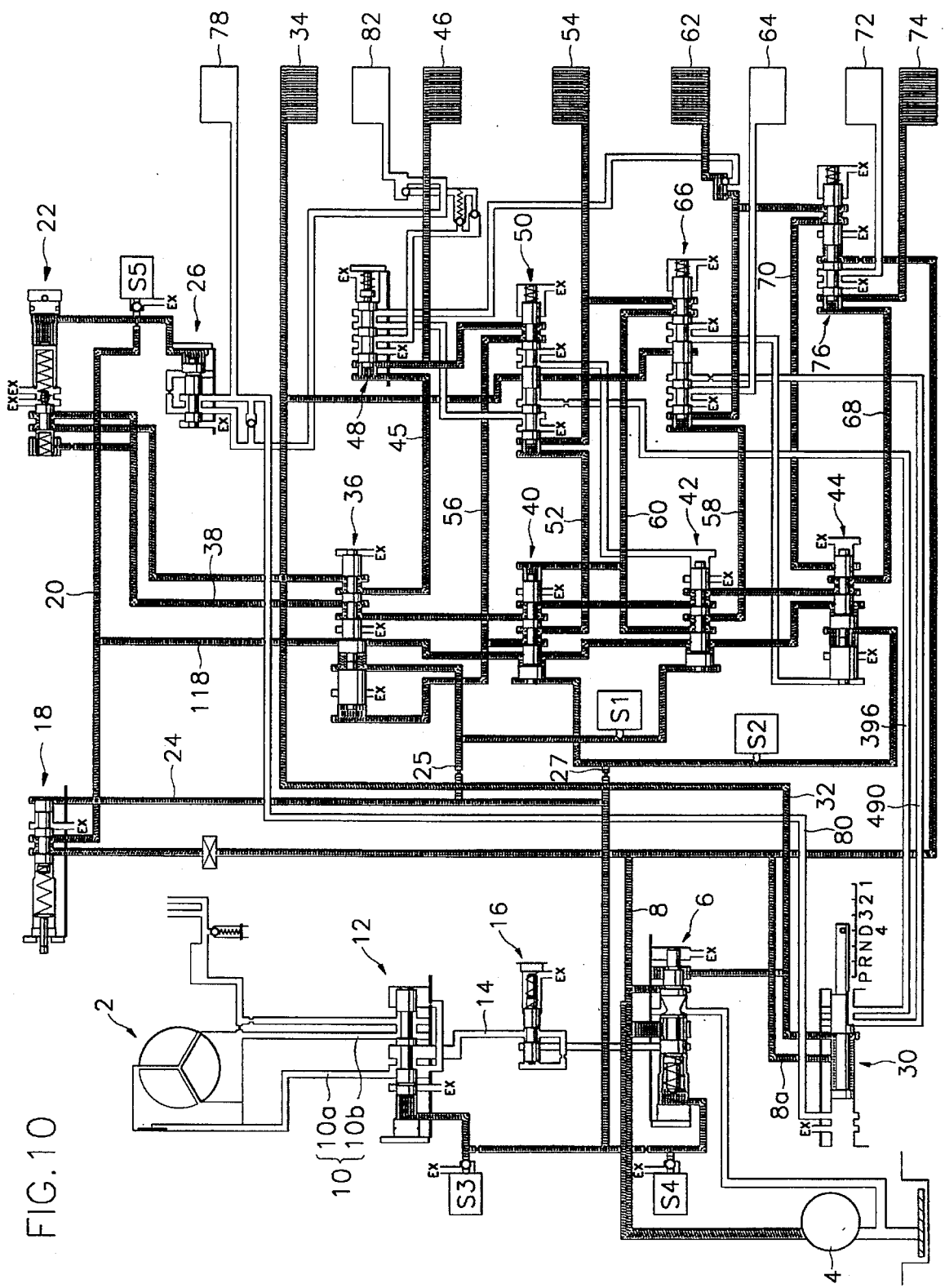
FIG. 10 is the hydraulic control system of FIG. 1 at a fourth-to-fifth speed shifting of the "D" range.

Thus, fourth speed is performed with first, second, third, fourth and sixth friction elements 34, 46, 54, 62 and 72 activated (see FIG. 9).

[Fourth-to-fifth shifting at the "D" range]

As the vehicle speed and the opening degree of the throttle position are increased art he fourth speed, the TCU controls the first and second solenoid valves S1 and S2 to ON states and, simultaneously, controls the fifth solenoid valve S5 to the ON state once and then to the OFF state gradually to increase torque pressure gradually.

Then, in a state where first, second, third, fourth and sixth friction elements 34, 46, 54, 62 and 72 are activated as have been in the fourth speed, torque pressure from the torque control regulator valve 22 is passed through conduits 38, 262, 300 and 334 and stays at the second port 366 of the fourth-to-fifth shift valve 44. Simultaneously, hydraulic pressure is supplied to the pressure chamber 380 of the fourth-to-fifth shift valve 44 according to the control of the second solenoid valve S2 to displace spool 382 rightward and enable the torque pressure of the second port 366 to communicate with the sixth port 374.

As ports 366 and 374 become communicated with each other, torque pressure is supplied along the conduit 68 to the pressure chamber 530 of the over-drive unit valve 76 to displace the spool 550 rightward and make first port 532 communicated with second port 536 such that torque pressure supplied from conduit 68 activates the seventh friction element 74 via the conduit 534.

Because the displacement of the spool 550 of the over-drive unit valve 76 prevents the third port 538 from communicating with the fourth port 542, hydraulic pressure by which the sixth friction element 72 is activated is obstructed and thus, the sixth friction element 72 is deactivated. As the sixth port 546 and fifth port 544 become communicated with each other, a portion of fluid of the drive pressure supplied through the conduit 502 is transmitted to conduit 70 via these ports 546 and 544 and stays at the fourth port 37 of the fourth-to-fifth shift valve 44.

As described above, fourth-to-fifth speed shifting at the "D" range is performed with the sixth friction element 72 which was activated at the fourth speed deactivated and first, second, third, fourth and seventh friction elements 34, 46, 54, 62 and 74 activated.

[Fifth speed of the "D" range]

As the fourth-to-fifth speed shifting is performed, the TCU controls the first solenoid valve S1 to the ON state and the second solenoid valve S2 to the OFF state.

The spool 382 of fourth-to-fifth shift valve 44 is displaced leftward to prevent the second port 328 from communicating with the sixth port 374 at the fourth-to-fifth speed shifting and make the fourth port 370 at which drive pressure is communicated with the sixth port 374 such that drive pressure is supplied along the conduit 68 to keep the seventh friction element 74 activated.

Figure 11:
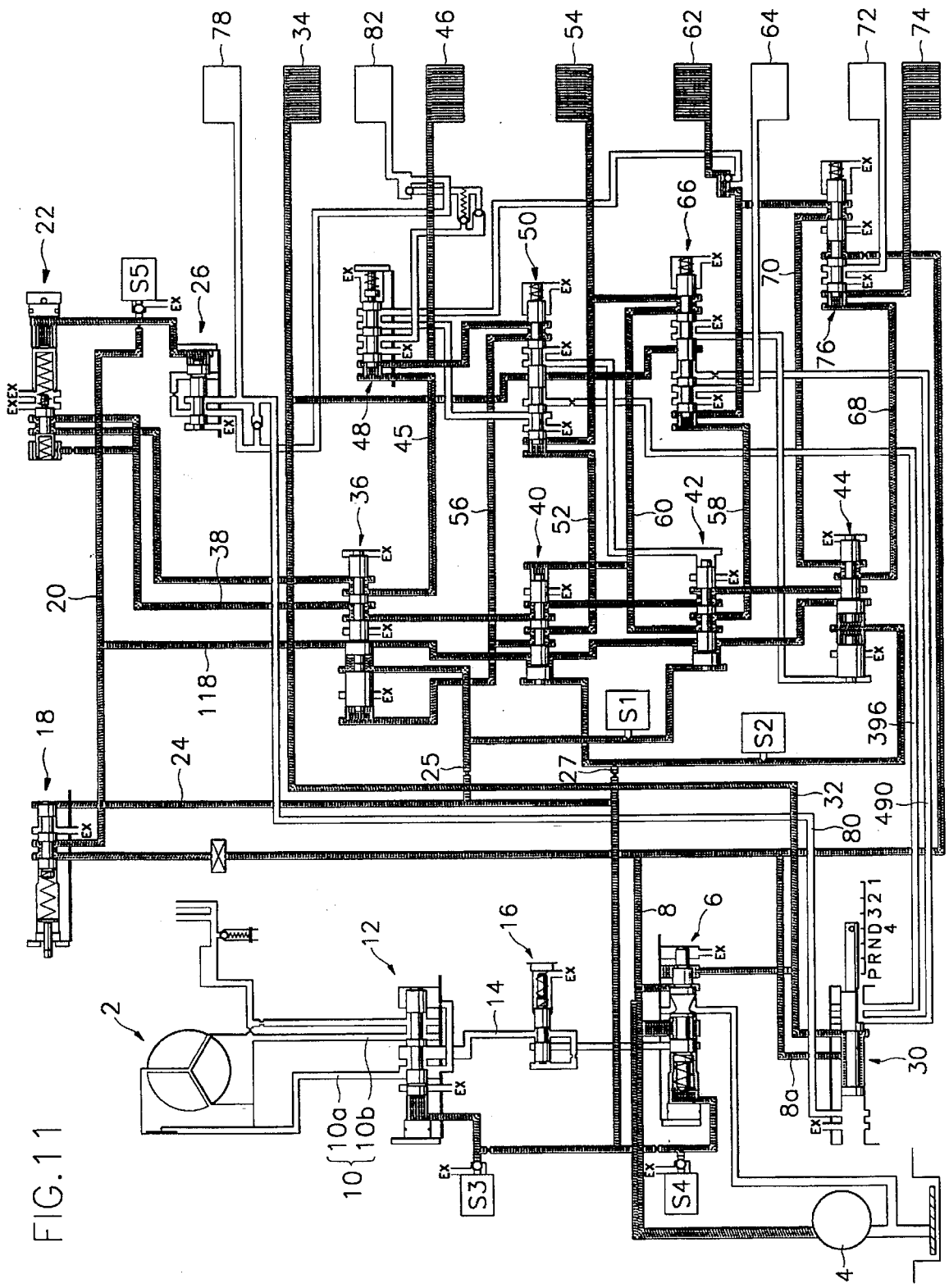
FIG. 11 is the hydraulic control system of FIG. 1 at a fifth speed of the "D" range.

Thus fifth speed is performed with first, second, third, fourth and seventh friction elements 34, 46, 54, 62 and 74 activated (See FIG. 11).

Speed shifting processes from the first speed to the fifth speed are explained up to now. According to the present embodiment, the friction elements are activated by torque pressure when speed shifting is initiated and then the torque pressure is shortly replaced by drive pressure to improve responsiveness.

[Reverse range]

Figure 12:
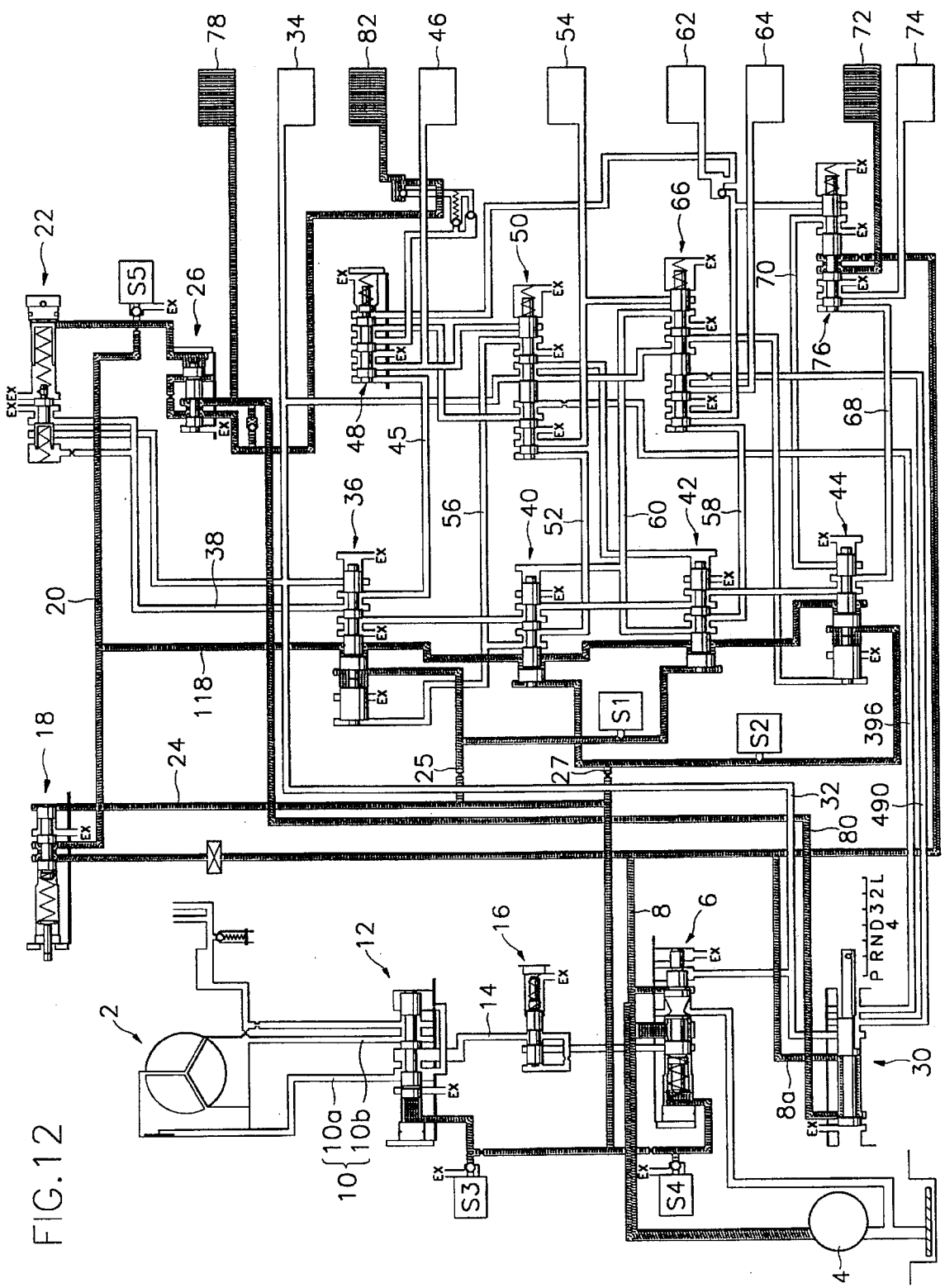
FIG. 12 is the hydraulic control system of FIG. 1 at an "R" (reverse) range.

As shown in FIG. 12, when the shift lever is positioned at a reverse mode, a portion of fluid of line pressure in conduit 8a supplied to the manual valve 30 is transmitted through the over-drive unit valve 76 to activate the sixth friction element 72. Another portion of the fluid is transmitted to the reverse conduit 80 to obstruct drive pressure supplied toward the drive pressure conduit 32.

Under this state, drive pressure supplied to the first shift control section D is obstructed, reverse pressure flowing along the reverse conduit 80 is transmitted to the eighth friction element 78, a reverse friction element, directly to activate the same.

At this moment, the TCU controls the fifth solenoid valve S5 to an OFF state, and hydraulic pressure transmitted via conduit 8 and decreased by the solenoid supply valve 18 is supplied to the pressure chamber 444 of the reverse clutch inhibiter valve 26 and applied to a right face of first land 446 of spool 442.

Accordingly, the spool 442 of the reverse clutch inhibiter valve 26 is displaced leftward, and the first port 448 communicates with a second port 430 such that a portion of pressurized fluid transmitted to the reverse conduit 80 can be supplied toward the conduit 424 through the second port 430.

Reverse pressure flowing through the conduit 424 activates the ninth friction element 82 via shuttle valve 426, and, accordingly, a reverse driving can performed in a state as shown in FIG. 12.

[Parking range]

Figure 13:
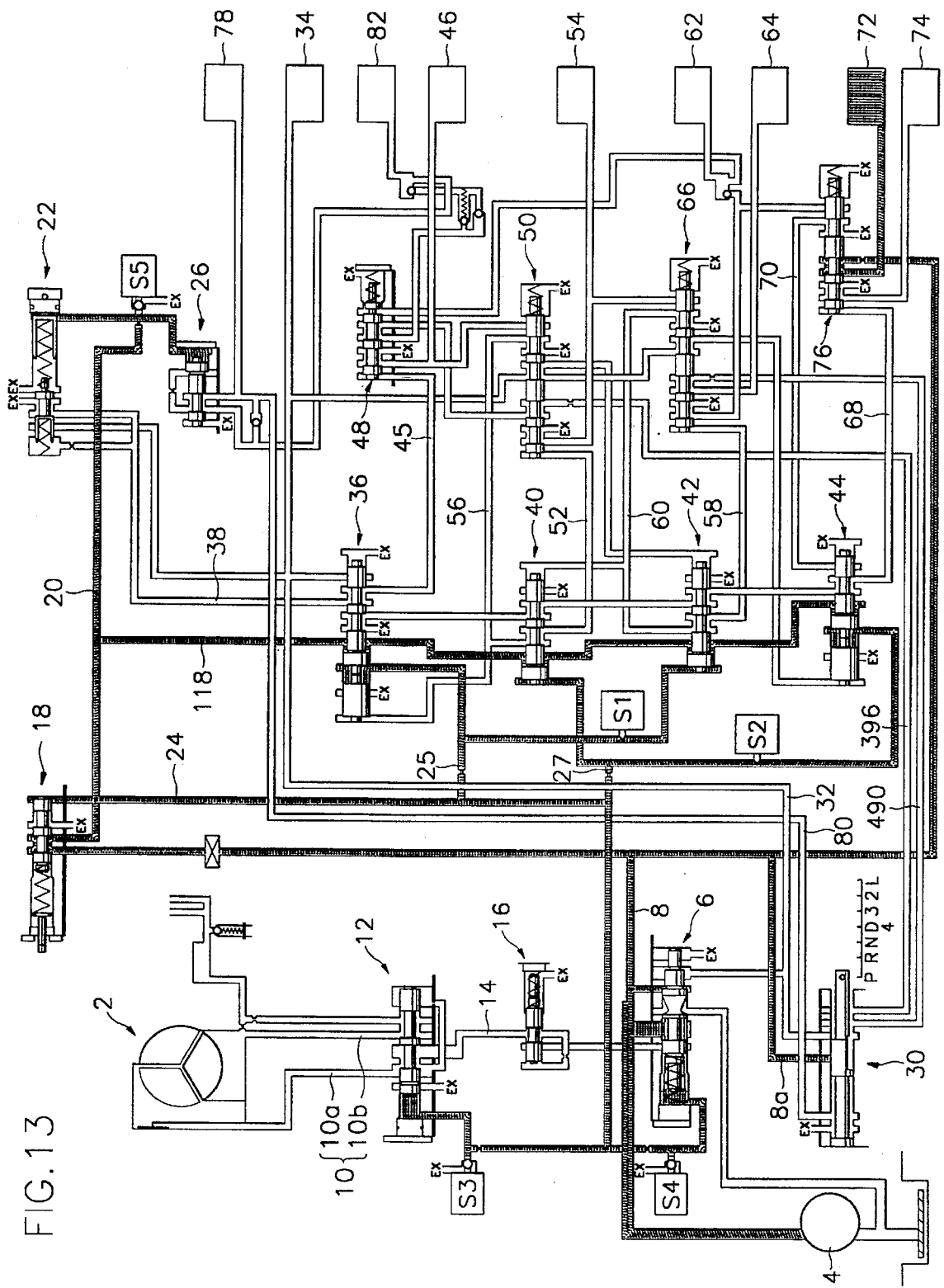
FIG. 13 is the hydraulic control system of FIG. 1 at a "P" (parking) range.

When the shift lever is positioned at a parking mode, line pressure in conduit 8a supplied to the manual valve 30 is obstructed as shown in FIG. 13 such that it can not flow through drive pressure conduit 32 or reverse pressure conduit 72, and the line pressure is completely exhausted at the manual valve 30 and does not influence operation of the friction elements.

As described above, in the automatic transmission system for an automotive vehicle according to the present invention, an over-drive switch can be OFF-controlled or ON-controlled to constitute a four-speed transmission system or a five-speed transmission system, respectively. By switching the over-drive switch to an OFF State, line pressure from the manual valve 30 flows through conduit 450 and a portion of pressurized fluid flows along the drive pressure conduit 32 such that each of the friction elements are activated to perform speed shifting according to the operation of the TCU as shown in FIG. 14A.

That is, the same friction elements as those activated at first, second, third and fourth speeds of the state the over-drive switch is switched ON are activated at first, second, third and fourth speed of the state the over-drive switch is switched OFF; first, fifth and sixth friction elements 34, 64 and 72 are activated at the first speed of the "3" range; first, second, fifth and sixth friction elements 34, 46, 64 and 72 are activated at the second speed of the 3 range; and first, second, third, fifth and sixth friction elements 34, 46, 54, 64 and 72 are activated at the second speed of the 3 range to perform the speed shifting until the third speed automatically.

Also, by selecting the "2" range of the shift lever, hydraulic pressure from the manual valve 30 is supplied along conduits 396 and 490 to the third clutch valve 50 and the fourth band valve 66, respectively. As drive pressure is supplied to first and second shift control sections D and E, first, fifth, sixth and ninth friction elements 34, 64, 72 and 82 are activated at the first speed; and first, second, fourth, fifth and sixth friction elements 34, 46, 62, 64 and 72 are activated at the second speed to perform the speed shifting until the second speed automatically.

Also, while the vehicle is driven at the first speed only when the "L" range is selected by the shift lever, at this moment, first, fifth, sixth and ninth friction elements 34, 64, 72 and 82 are activated.

According to the present invention, it is not only possible to perform automatic speed shifting controlled by the TCU, but also possible to perform a speed shifting operation equivalent to a manual speed shifting operation performed by a driver by selecting the shift lever from the "L" range to the "D" range.

Because both of first and second solenoid valves S1 and S2 are controlled to the OFF states, the vehicle is driven at the third speed stage when the TCU is not operating regularly.

On the other hand, when the driver makes an error that the shift lever is selected to the reverse range while driving in the "D" range, as an emergency safety means, the fifth solenoid valve S5 is controlled to the ON state by the TCU.

As the fifth solenoid valve S5 is controlled to the ON state, hydraulic pressure in the pressure chamber 444 of the reverse clutch inhibiter valve 26 is exhausted. A portion of pressurized fluid supplied from the reverse pressure conduit 80 through the first port 420 of the reverse clutch inhibiter valve 26 is supplied via the bypass conduit 432 to the fourth port 436 to apply on the left face of second land 448 and displace the spool 442 rightward.

As a result, the third land 450 obstructs the second port 430 and supply of hydraulic pressure toward the conduit 424 is obstructed, such that hydraulic pressure is not supplied to activate the ninth friction element 82, and, therefore, the vehicle is not driven rearward even though the shift lever is selected to the "R" range (See FIG. 13).

FIG. 14A illustrates which friction elements are activated at each shift stage in the hydraulic control system according to the invention.

FIG. 14B illustrates how solenoid valves are operated at each shift stage in the hydraulic control system according to the invention. When shifting speed, the first and second solenoid valves S1 and S2 are controlled to ON/OFF states by the TCU. When shifting up, the fifth solenoid valve S5 is initially controlled to the OFF state and then to the ON state gradually. On the contrary, when shifting down, the fifth solenoid valve S5 is initially controlled to the ON state and then to the OFF state gradually, and, when the speed shifting is completed, the fifth solenoid valve S5 is controlled to the ON state.

As described above, in the automatic transmission system according to the invention, the power transmission efficiency can be improved and the shock caused during speed shifting can be reduced because the line pressure can be controlled to the levels required for each speed stage; the response is prompt because the speed shifting is first performed by the torque pressure and secondly by the drive pressure; an emergency safety means is provided to prevent the vehicle from being driven rearward when the reverse range is selected in error during driving forward; and a manual speed shifting operation can be performed at the drivers's choice.

What is claimed is:

1. An automatic transmission for an automotive vehicle comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a solenoid supply valve for receiving line pressure from the pressure regulating valve and supplying reduced pressure to first, second, third, fourth and fifth solenoid valves;

a first friction element commonly activated at each of a plurality;

second, third, fourth, fifth, sixth, seventh, eighth and ninth friction elements, at least one of which is activated according to the speed stages;

a torque control regulator valve for supplying torque pressure required to activate the friction elements;

a manual valve; first-to-second and third-to-fourth speed shift valves for selectively supplying the torque pressure supplied from the torque control regulator valve or drive pressure regulated by the pressure regulating valve and to the friction elements according to the ON/OFF operation of the first solenoid valve to shift speed;

second-to-third and fourth-to-fifth speed shift valves for selectively supplying the torque pressure supplied from the torque control regulator valve or the drive pressure regulated by the pressure regulating valve to the friction elements according to ON/OFF operation of the second solenoid valve to shift speed; and second and third speed clutch valves, a fourth speed band valve and an over-drive unit valve controlled by the torque pressure for supplying activating pressure to the friction elements of the respective speed stages and supplying the activating pressure of next speed stages to the shift valves, wherein the manual valve supplies the line pressure regulated by the pressure regulating valve according to a position of a shift lever to the torque control regulator valve, the clutch valves and the band valve or to the first and sixth friction elements.

2. The automatic transmission for an automotive vehicle according to claim 1, wherein the eighth friction element is a reverse friction element connected to the manual valve via a reverse pressure conduit directly to receive hydraulic pressure therefrom.

3. The automatic transmission for an automotive vehicle according to claim 1, wherein a reverse clutch inhibiter valve for keeping the vehicle from being driven rearward when a reverse range is selected at a drive range obstructs supply of hydraulic pressure to the ninth friction element and is disposed in a reverse pressure conduit through which hydraulic pressure is supplied to the eighth friction element to provide an emergency safety means.

4. The automatic transmission for automotive vehicle according to claim 1, wherein the torque control regulator valve comprises:

a pressure chamber for receiving hydraulic pressure controlled by the fifth solenoid valve;

a first spool for selectively obstructing the torque pressure supplied to the first-to-second shift valve;

a second spool to which pressure in the pressure chamber is applied;

a first elastic member for biasing the first spool; and a second elastic member disposed between the first spool and the second spool to support the first and second spools elastically, said second elastic member exerting an elastic force greater than that of the first elastic member.

5. The automatic transmission for an automotive vehicle according to claim 1, wherein the first-to-second shift valve comprises:

first, second and third ports for receiving hydraulic pressure from a control pressure, a torque pressure and a drive pressure conduit, respectively;

a fourth port communicating with the third clutch valve;

a fifth port communicating with a control pressure branch conduit;

sixth and seventh ports for transmitting the torque pressure and control pressure, respectively, to the second-to-third shift valve;

an eighth port for supplying hydraulic pressure to the second clutch valve;

a spool for opening or closing the ports by an ON/OFF operation of the first solenoid valve and hydraulic pressure supplied from the third clutch valve.

6. The automatic transmission for an automotive vehicle according to claim 1, wherein the second-to-third shift valve comprises:

a first port connected to a control conduit;

second and third ports for receiving hydraulic pressure from the first-to-second shift valve;

a fourth port for receiving the drive pressure from the third clutch valve;

fifth and Sixth ports for transmitting the torque pressure and a control pressure, respectively, to the third-to-fourth shift valve;

a seventh port for transmitting hydraulic pressure to the third clutch valve;

an eighth port for receiving the drive pressure from the fourth speed valve; and a spool for opening or closing the ports according to an ON/OFF control of the second solenoid valve.

7. The automatic transmission for an automotive vehicle according to claim 1, wherein the third-to-fourth shift valve comprises:

a first port communicating with a branch conduit;

second and third ports for receiving hydraulic pressure from the first-to-second shift valve;

a fourth port for receiving the drive pressure from the fourth speed band valve;

fifth and sixth ports for transmitting the torque pressure and a control pressure, respectively, to the fourth-to-fifth shift valve;

a seventh port for transmitting hydraulic pressure to the fourth band valve;

an eighth port communicating with the third shift valve; and a spool for opening or closing the ports according to an ON/OFF control of the first solenoid valve.

8. The automatic transmission for an automotive vehicle according to claim 1, wherein the fourth-to-fifth shift valve comprises:

a first port connected to the fourth speed band valve;

second and third ports for receiving the torque pressure and a control pressure, respectively, from the third-to-fourth shift valve;

a fourth port for receiving the drive pressure from the over-drive unit valve;

a fifth port communicated with a control conduit for receiving the control pressure;

a sixth port communicated with the over-drive unit valve for transmitting the torque pressure or the drive pressure; and a spool for opening or closing the ports according to an ON/OFF control of the second solenoid valve.

9. The automatic transmission for an automotive vehicle according to claim 1, wherein the manual valve has modes for "P", "R", "N", "D", "3", "2" and "L" ranges.

10. The automatic transmission for an automotive vehicle according to claim 9, wherein the manual valve can be shifted to the "D", "3", "2" and "L" ranges manually.

11. The automatic transmission for an automotive vehicle according to claim 10, wherein the drive pressure is supplied to the first friction element directly and the sixth friction element is activated through the over-drive unit valve at a first speed stage of the "D" range.

12. The automatic transmission for an automotive vehicle according to claim 10, wherein the first solenoid valve for controlling the first-to-second and third-to-fourth shift valves is controlled to an OFF state and the second solenoid valve for controlling the second-to-third and fourth-to-fifth shift valves is controlled to an ON state to supply the drive pressure to friction elements which are activated at a first speed stage of the "D" range and to a second friction element at a second speed stage of the "D" range.

13. The automatic transmission for an automotive vehicle according to claim 10, wherein the first and second solenoid valves are controlled to ON states to supply the drive pressure to friction elements which are activated at a second speed stage of the "D" range and to a third friction element at a third speed stage of the "D" range.

14. The automatic transmission for an automotive; vehicle according to claim 10, wherein the first solenoid valve for controlling the first-to-second and third-to-fourth shift valves is controlled to an ON state and the second solenoid valve for controlling the second-to-third and fourth-to-fifth shift valves is controlled to an OFF state to supply the drive pressure to friction elements which are activated at a third speed stage of the "D" range and to a fourth friction element at a fourth speed stage of the "D" range.

15. The automatic transmission for an automotive vehicle according to claim 10, wherein the first solenoid valve for controlling the first-to-second and third-to-fourth shift valves is controlled to an ON state and the second solenoid valve for controlling the second-to-third and fourth-to-fifth shift valves is controlled to an OFF state to deactivate the sixth friction element among friction elements which are activated at the fourth speed stage of the "D" range and to supply the drive pressure to a seventh friction element at a fifth speed stage of the "D" range.

16. The automatic transmission for an automotive vehicle according to claim 1, wherein the solenoid supply valve has a spool, an elastic member for biasing the spool to regulate hydraulic pressure exhausted from the solenoid supply valve, and a screw for compressing or releasing the elastic member.

17. The automatic transmission for an automotive vehicle according to claim 1, wherein the fifth solenoid valve is gradually controlled from an ON state to an OFF state when shifting up and is controlled from the OFF state to the ON state when shifting down.

18. The automatic transmission for an automotive vehicle according to claim 1, wherein the fifth solenoid valve is controlled to an ON state at a first speed and to an OFF state at other speed stages after a speed shifting.

19. An automatic transmission for an automotive vehicle comprising:

a pressure regulating valve for varying hydraulic pressure supplied from a hydraulic pump when driving the vehicle forward or rearward;

a solenoid supply valve for receiving line pressure from the pressure regulating valve and supplying reduced pressure to first, second, and third solenoid valves;

a plurality of friction elements, at least one of which is activated during a speed stage;

a torque control regulator valve for supplying torque pressure required to activate the friction elements;

a manual valve supplying, according to a position of a shift lever, line pressure regulated by the pressure regulating valve to the torque control regulator valve;

first-to-second and third-to-fourth speed shift valves for selectively supplying the torque pressure supplied from the torque control regulator valve or drive pressure regulated by the pressure regulating valve and supplied from the manual valve to the friction elements according to the ON/OFF operation of the first solenoid valve to shift the speed stage; and second-to-third and fourth-to-fifth speed shift valves for selectively supplying the torque pressure supplied from the torque control regulator valve or the drive pressure regulated by the pressure regulating valve and supplied from the manual valve to the friction elements according to ON/OFF operation of the second solenoid valve to shift the speed stage.

20. The automatic transmission for an automotive vehicle according to claim 19, further comprising:

second and third speed clutch valves, a fourth speed band valve and an over-drive unit valve controlled by the torque pressure for supplying activating pressure to the friction elements of the respective speed stages and supplying the activating pressure for subsequent speed stages to the first-to-second, second-to-third, third-to-fourth, and fourth-to-fifth shift valves.

* * * * *